US012686144B2

(12) United States Patent
McGuffin-Noll

(10) Patent No.: US 12,686,144 B2
(45) Date of Patent: Jul. 21, 2026

(54) TELESCOPING SLICER

(71) Applicant: Globe Food Equipment Co., Dayton, OH (US)

(72) Inventor: Douglas Joseph McGuffin-Noll, Westerville, OH (US)

(73) Assignee: Globe Food Equipment Co., Dayton, OH (US)

( * ) Notice: Subject to any disclaimer, the term of this patent is extended or adjusted under 35 U.S.C. 154(b) by 186 days.

(21) Appl. No.: 18/477,852

(22) Filed: Sep. 29, 2023

(65) Prior Publication Data

US 2025/0108533 A1 Apr. 3, 2025

(51) Int. Cl.
*B26D 7/26* (2006.01)
*B26D 7/22* (2006.01)

(52) U.S. Cl.
CPC ........... *B26D 7/2621* (2013.01); *B26D 7/225* (2013.01); *B26D 7/2635* (2013.01)

(58) Field of Classification Search
CPC .... B26D 7/225; B26D 7/2621; B26D 7/2635; B26D 2210/02; B26D 1/28; B26D 7/01
See application file for complete search history.

(56) References Cited

U.S. PATENT DOCUMENTS

| | | | | |
|---|---|---|---|---|
| 4,441,411 | A * | 4/1984 | Mullins, Jr. .............. | B26D 3/11 99/593 |
| 7,699,119 | B1 * | 4/2010 | Lunde ..................... | E21B 17/22 175/323 |
| 10,589,439 | B2 | 3/2020 | McGuffin-Noll et al. | |
| 2013/0334352 | A1 * | 12/2013 | Beber ................. | A47J 43/0716 241/100 |
| 2017/0232628 | A1 | 8/2017 | McGuffin-Noll et al. | |
| 2021/0137154 | A1 * | 5/2021 | Schmidt ................... | B26D 3/24 |

FOREIGN PATENT DOCUMENTS

| | | | | |
|---|---|---|---|---|
| DE | 10155408 A1 * | 5/2003 | ........... | B26D 7/2635 |
| EP | 3 400 116 B1 | 3/2018 | | |

* cited by examiner

*Primary Examiner* — Liang Dong
(74) *Attorney, Agent, or Firm* — Crowell & Moring LLP

(57) ABSTRACT

A slicer may include a base, a lower assembly, an upper assembly, and a knife. The lower assembly is supported by the base. The upper assembly is moveably coupled to the lower assembly. The knife is coupled to the upper assembly and is rotatable around a rotation axis. The upper assembly is movable along the rotation axis, relative to the lower assembly, between an initial position and an extended position.

25 Claims, 38 Drawing Sheets

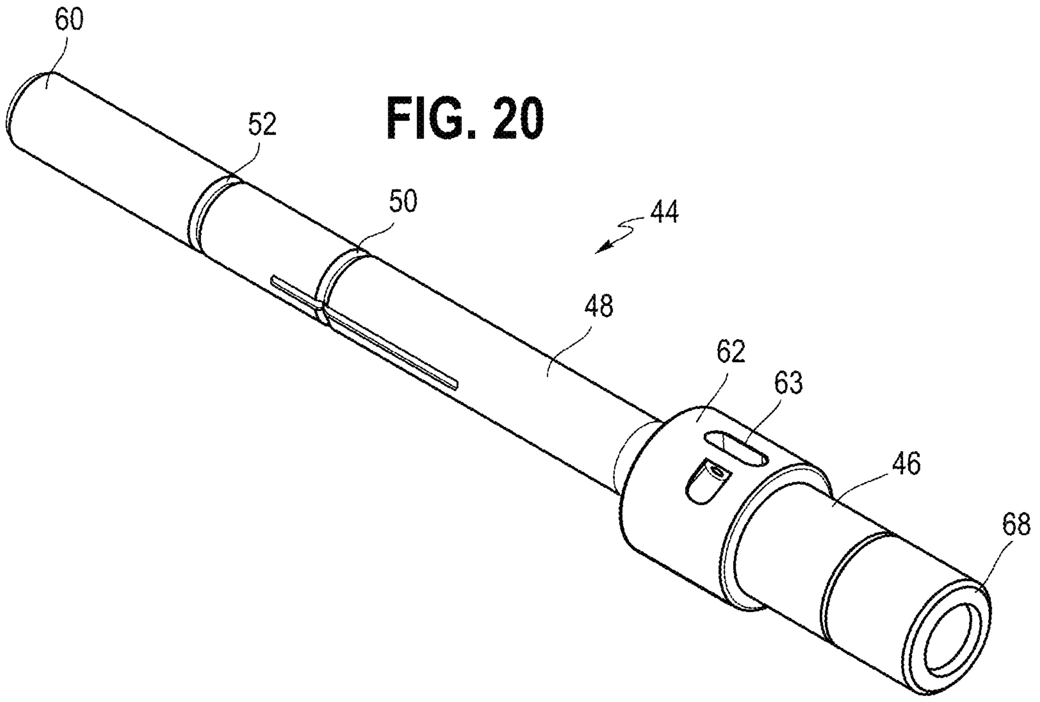
FIG. 20
FIG. 21
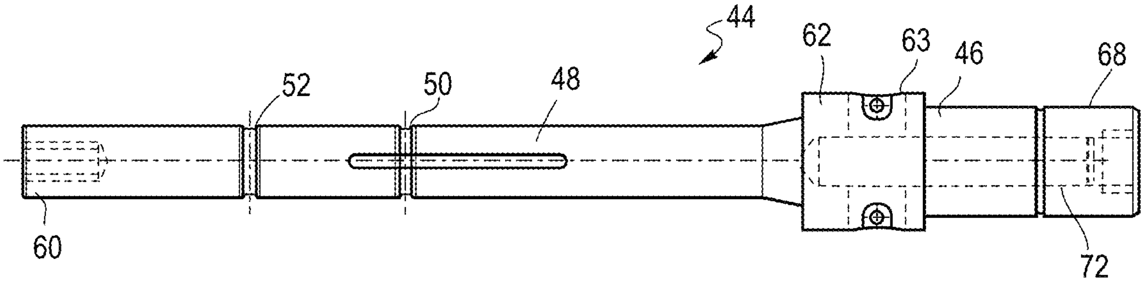

TELESCOPING SLICER

TECHNICAL FIELD

The present disclosure relates generally to a telescoping slicer, and more particularly, to a food product slicer and the components associated with the telescoping knife drive shaft.

BACKGROUND

Deli/meat slicers have a history of being difficult and time consuming to clean, with the knife guard area (e.g., the ring guard) that protects the operator from the sharp knife edge. This area that gets cleaned usually requires a brush or towel that gets slid between the knife edge and ring guard, which is time consuming. A slicer that provides an easier way for cleaning is desired.

SUMMARY

One general aspect of the present disclosure includes a slicer, including a base; a lower assembly supported by the base; an upper assembly moveably coupled to the lower assembly; and a knife coupled to the upper assembly, where the knife is rotatable around a rotation axis, and where the upper assembly is movable along the rotation axis, relative to the lower assembly between an initial position and an extended position.

Another general aspect of the present disclosure includes a slicer, including a base; a lower assembly supported by the base; an upper assembly moveably coupled to the lower assembly; and a rotatable knife coupled to the upper assembly, where the upper assembly is movable relative to the lower assembly along a longitudinal axis of the upper assembly.

Another general aspect of the present disclosure includes a slicer, including a base; a lower assembly supported by the base; an upper assembly moveably coupled to the lower assembly; a rotatable knife coupled to the upper assembly; and a telescoping tool assembly releasably coupled to the upper assembly, where the telescoping tool assembly is configured to move the knife between an operating position and a cleaning position, where the cleaning position includes the knife remaining attached to the slicer.

Another general aspect of the present disclosure includes a method of moving a knife of a slicer between an operating position and a cleaning position, where the slicer includes a base, a lower assembly supported by the base, an upper assembly moveably coupled to the lower assembly, and a knife coupled to the upper assembly, the method including: coupling a telescoping tool assembly to the upper assembly; moving the knife from the operating position to the cleaning position, by pulling the knife away from the lower assembly via the telescoping tool assembly; moving the knife from the cleaning position to the operating position by pushing the knife back towards the lower assembly via the telescoping tool assembly; and removing the telescoping tool assembly from the upper assembly.

A slicer according to the present disclosure may include any combination of the features described above and/or the original as-filed claims.

Other systems, methods, features and advantages of the invention will be, or will become, apparent to one with skill in the art upon examination of the following figures and detailed description. It is intended that all such additional systems, methods, features and advantages be within the scope of the invention.

BRIEF DESCRIPTION OF DRAWINGS

FIG. 20 is a perspective view of the upper shaft of the upper assembly of FIG. 14.

FIG. 21 is a side view of the upper shaft of FIG. 20.

DETAILED DESCRIPTION

Figure 1:
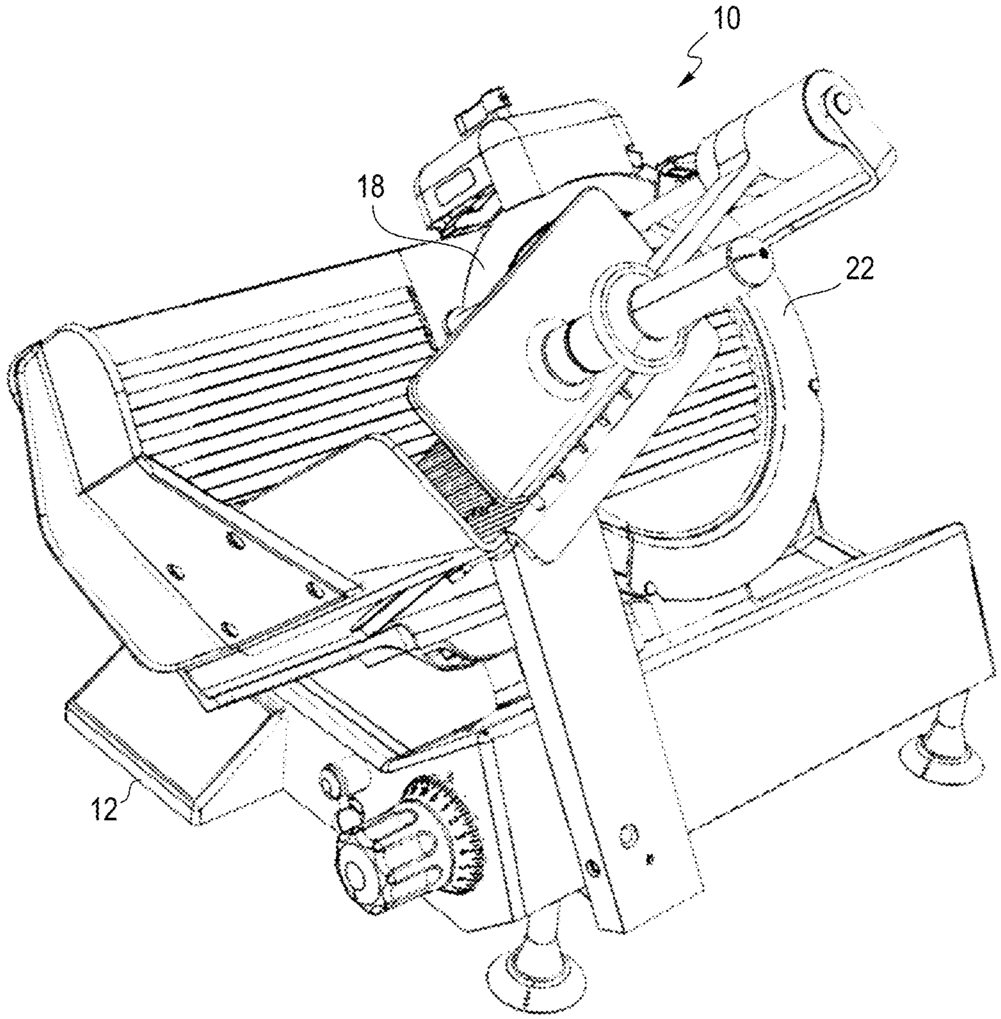
FIG. 1 is a perspective view of an embodiment of a product slicer, showing a knife and a knife cover.
Figure 2:
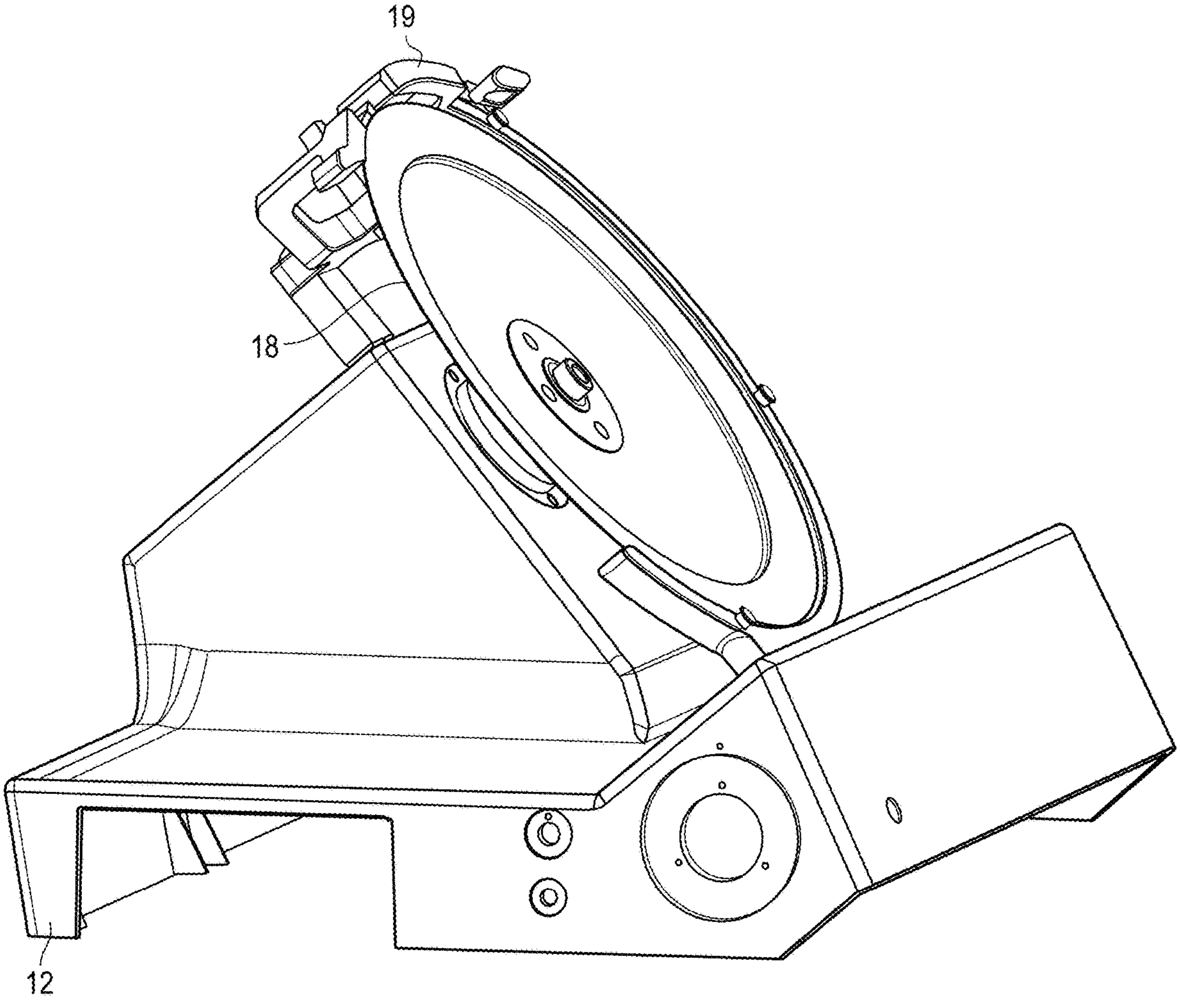
FIG. 2 is a perspective view of a portion of the product slicer of FIG. 1, showing the knife cover is removed.
Figure 3:
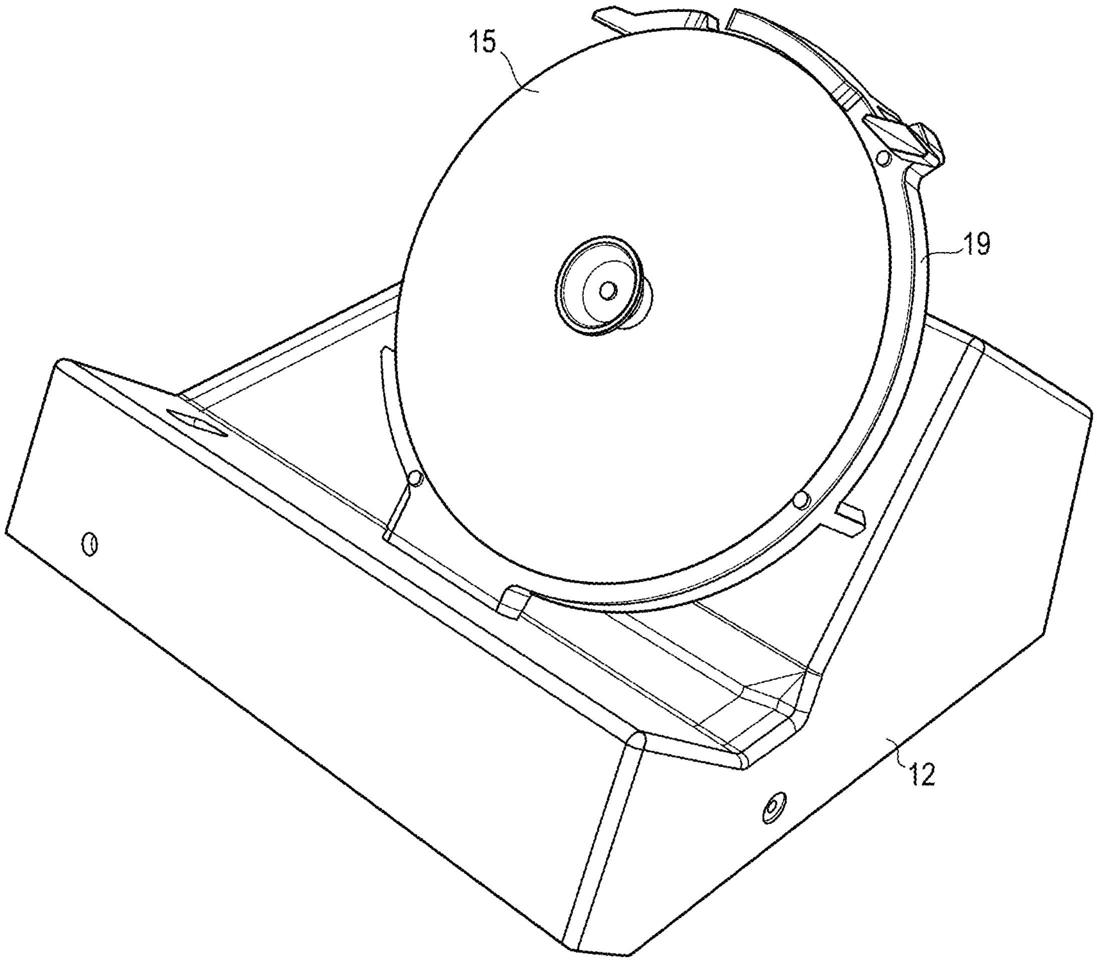
FIG. 3 is another perspective view of the portion of the product slicer of FIG. 2, showing a telescoping tool assembly is installed thereon.

Various embodiments are described below with reference to the drawings in which like elements generally are referred to by like numerals. The relationship and functioning of the various elements of the embodiments may better be understood by reference to the following detailed description. However, embodiments are not limited to those illustrated in the drawings. It should be understood that the drawings are not necessarily to scale, and in certain instances details may have been omitted that are not necessary for an understanding of embodiments disclosed herein, such as—for example—conventional fabrication and assembly.

Generic Description

The invention is defined by the claims, may be embodied in many different forms, and should not be construed as limited to the embodiments set forth herein; rather, these embodiments are provided so that this disclosure will be thorough and complete, and will fully convey enabling disclosure to those skilled in the art. As used in this specification and the claims, the singular forms “a,” “an,” and “the” include plural referents unless the context clearly dictates otherwise. Reference herein to any industry standards (e.g., ASTM, ANSI, IEEE standards) is defined as complying with the currently published standards as of the original filing date of this disclosure concerning the units, measurements, and testing criteria communicated by those standards unless expressly otherwise defined herein.

The terms “about,” “substantially,” “generally,” and other terms of degree, when used with reference to any volume, dimension, proportion, or other quantitative or qualitative value, are intended to communicate a definite and identifiable value within the standard parameters that would be understood by one of skill in the art (equivalent to a mechanical engineer with experience in this field), and should be interpreted to include at least any legal equivalents, minor but functionally-insignificant variants, standard manufacturing tolerances, and including at least mathematically significant figures (although not required to be as broad as the largest range thereof), including a variance of up to 5%. In addition, the term “configured to” is used to describe structural limitations in a particular manner that requires specific construction to accomplish a stated function and/or to interface or interact with another component(s), and is not used to describe mere intended or theoretical uses.

One embodiment of a telescoping slicer is described with reference to FIGS. 1-30. Referring to FIGS. 1-8, the slicer 10 includes a base 12, a lower assembly 14 supported by the base 12, an upper assembly 16 moveably coupled to the lower assembly 14, and a knife 18 coupled to the upper assembly 16. The knife 18 may have a circular configuration and is rotatable around a rotation axis 20. The rotation axis 20 may extend through the center of the knife 18. The knife 18 may be covered by a knife cover 22 during the operation of the knife 18 in order to prevent injury to a user.

Figure 4:
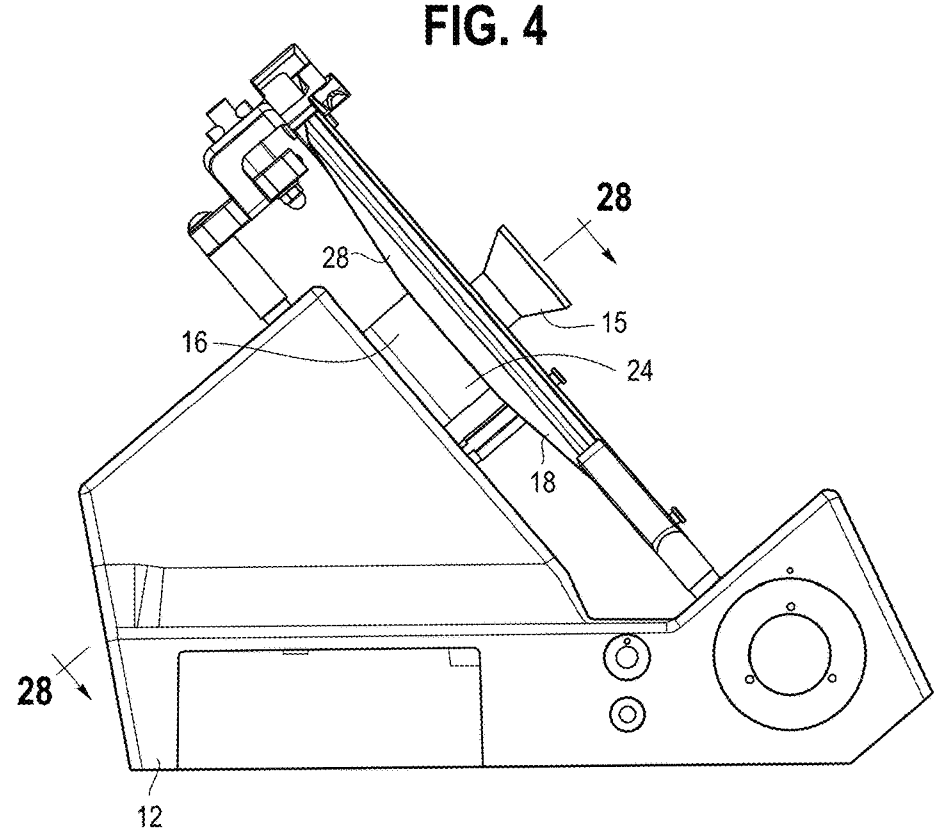
FIG. 4 is another perspective view of the portion of the product slicer of FIG. 3, showing the knife is in an operating position.
Figure 5:
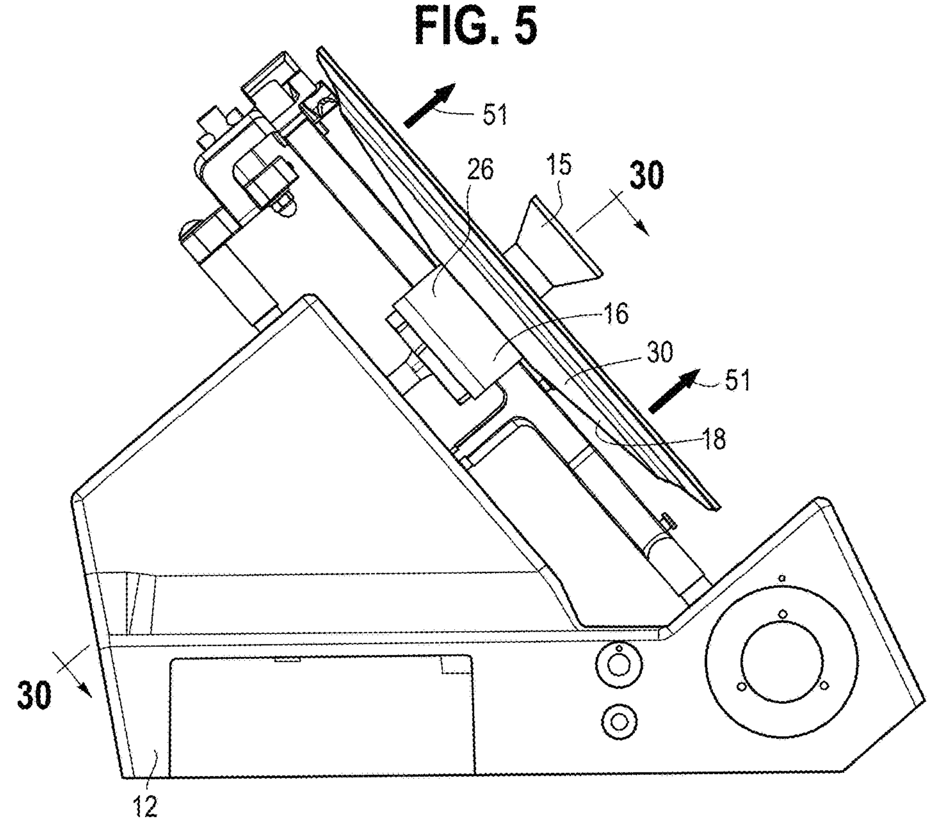
FIG. 5 is another perspective view of the portion of the product slicer of FIG. 3, showing the knife is in a cleaning position.
Figure 6:
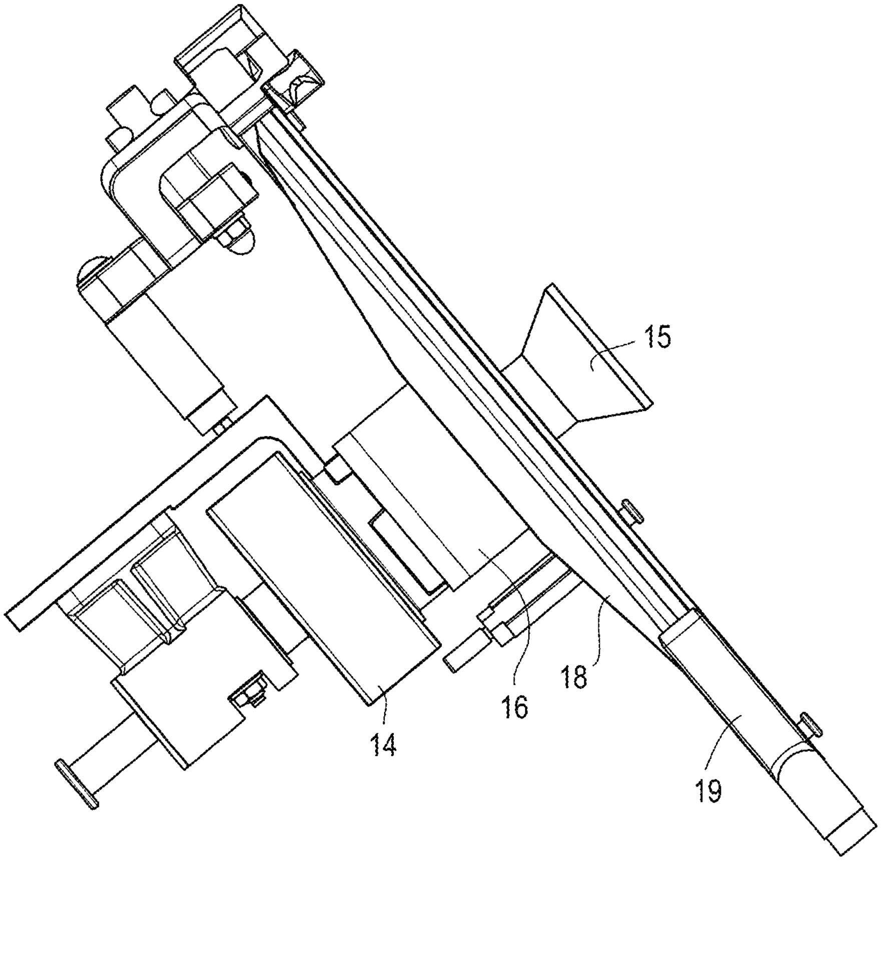
FIG. 6 is another perspective view of a portion of the product slicer of FIG. 4, showing a lower assembly, an upper assembly, a knife, and a telescoping tool assembly.
Figure 7:
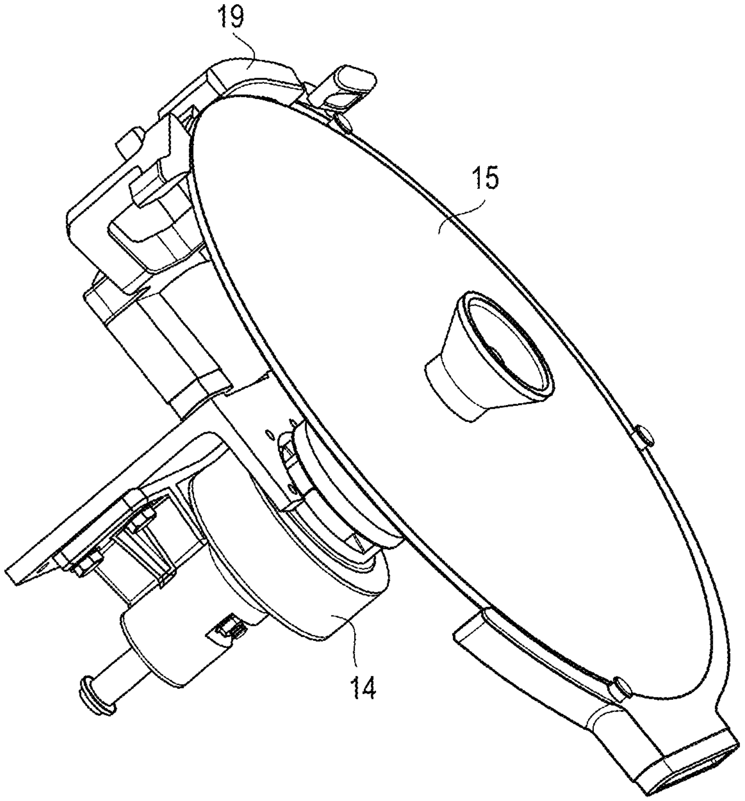
FIG. 7 is another perspective view of a portion of the product slicer of FIG. 6 6.
Figure 8:
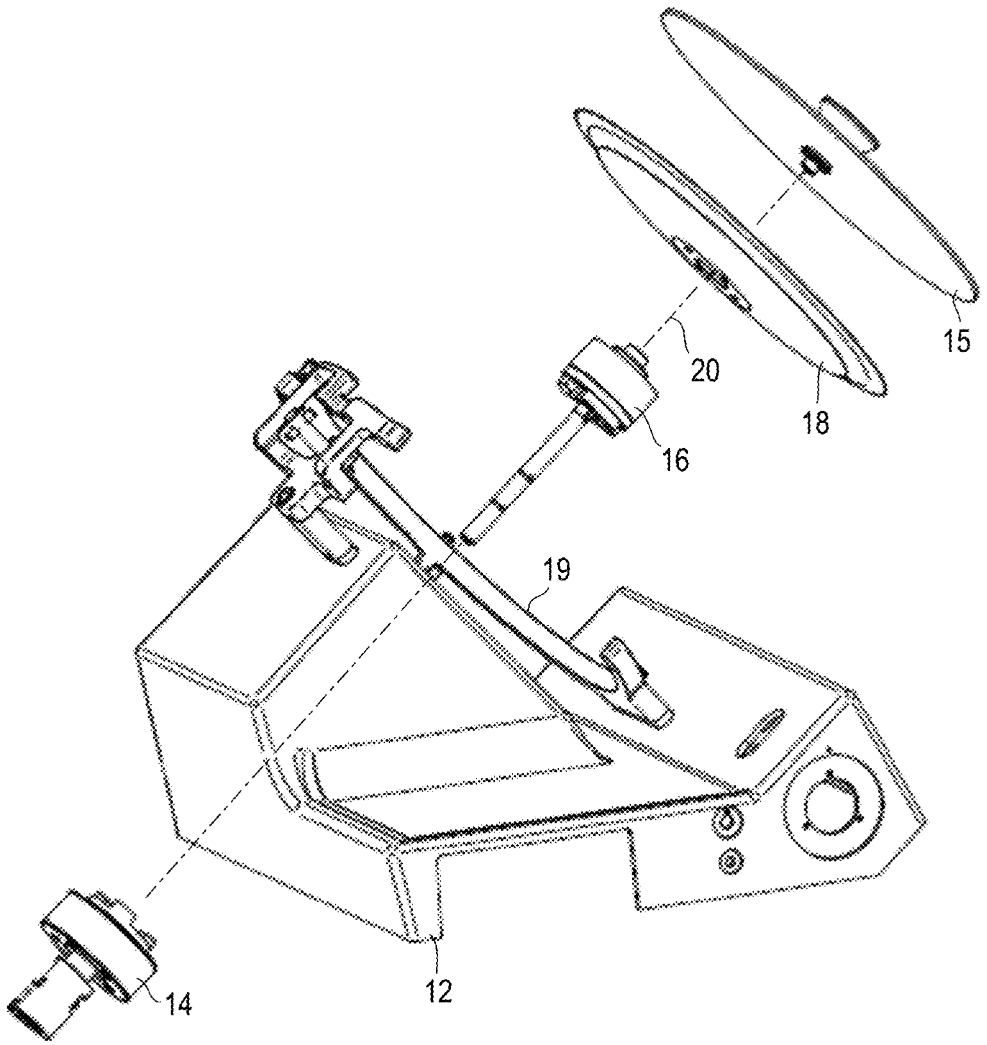
FIG. 8 is an exploded view of a portion of the product slicer of FIG. 4, showing a lower assembly, an upper assembly, a ring guard, a knife, and a telescoping tool assembly.
Figure 9:
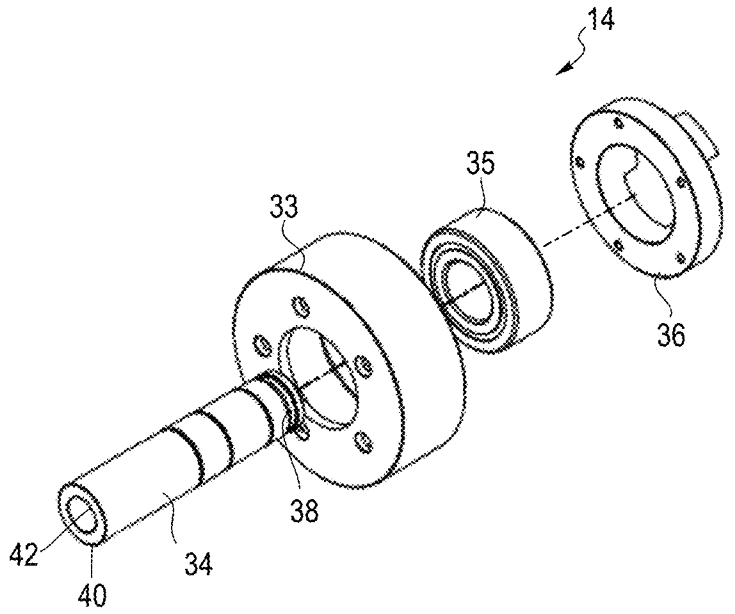
FIG. 9 is an exploded view of a portion of the lower assembly of the product slicer of FIG. 8, showing a lower shaft and a lower engagement portion.
Figure 10:
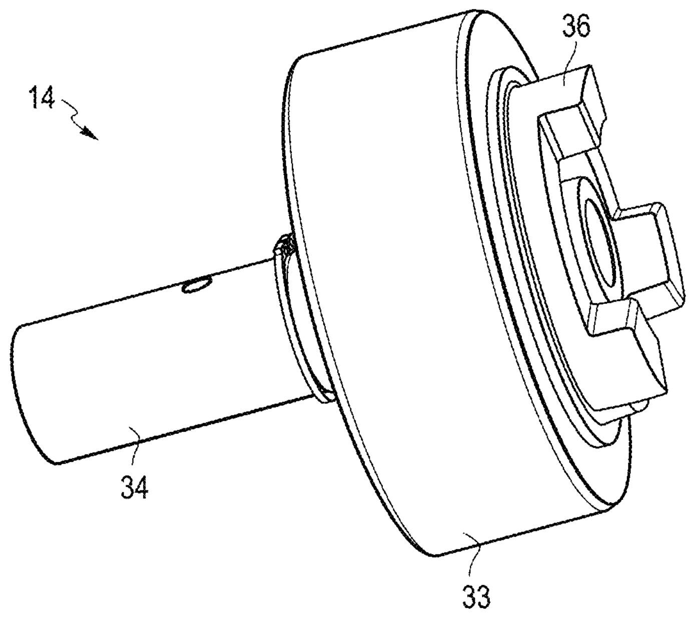
FIGS. 10 and 11 are perspective views of the assembled lower assembly of FIG. 8.
Figure 11:
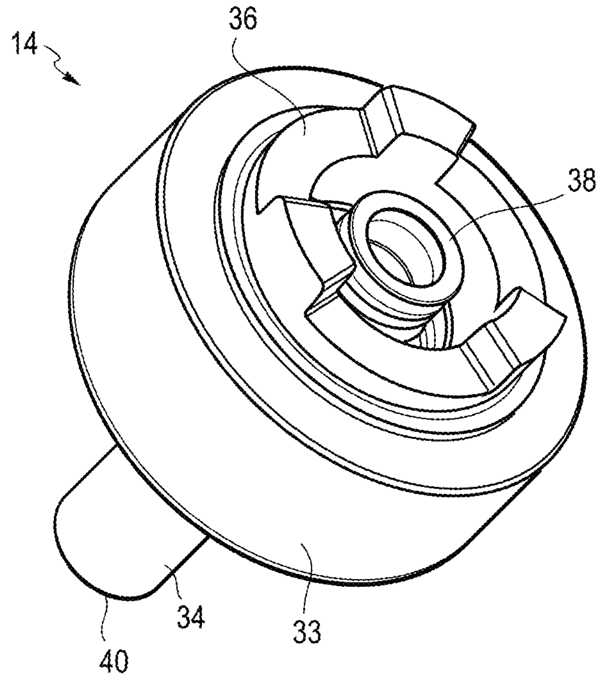
Figure 12:
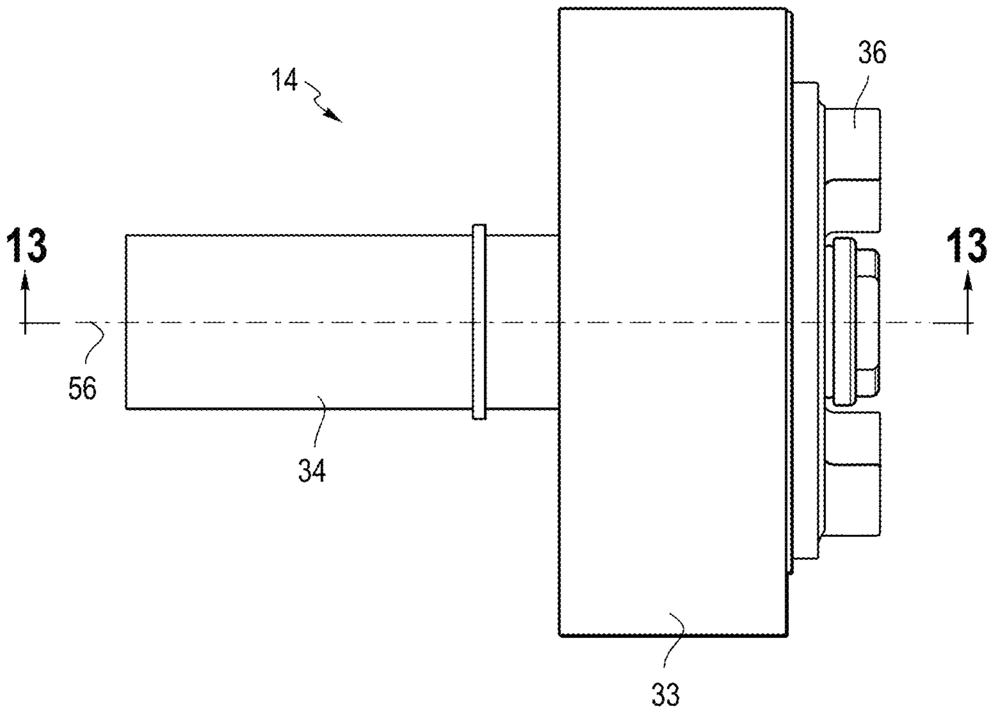
FIG. 12 is a side view of the assembled lower assembly of FIGS. 10 and 11.

As described in greater detail below, the upper assembly 16 is movable along the rotation axis 20, relative to the lower assembly 14, between an initial position 24 (e.g., as shown in FIG. 4) and a static, held-in-place extended position 26 (e.g., as shown in FIG. 5) that remains attached to the telescoping slicer in a manner different than disassembly along the rotation axis. Referring to FIG. 8, the lower assembly 14, the upper assembly 16, and the knife 18 may be coupled together coaxially, such that the upper assembly 16 is movable relative to the lower assembly 14 along a longitudinal axis 32 (same as the rotation axis 20) of the upper assembly 16.

As described in greater detail below, when the upper assembly 16 is secured to the lower assembly 14 in the initial position 24, the knife 18 is in an operating position 28 (e.g., as shown in FIG. 4), and when the upper assembly 16 is secured to the lower assembly 14 is in the extended position 26, the knife 18 is in a cleaning position 30 (e.g., as shown in FIG. 5). As shown, the knife 18 moves further away from the lower assembly 14 when the knife moves from the operating position 28 to the cleaning position 30.

When the knife 18 is in the operating position 28, the slicer 10 is configured to perform the slicing function, and when the knife 18 is in the cleaning position 30, the slicer 10 can be easily cleaned, but is prevented from performing the slicing function. This telescoping configuration is advantageous as it provides an easier way for cleaning the slicer, especially for cleaning the area behind the knife 18. By moving the knife further away from the lower assembly 14, it opens up access to the area behind the knife 18 and the ring guard 19, and the area between the knife 18 and the ring guard 19, allowing a user to have easier access to cleaning the knife 18 and adjacent areas/structures, such that the time needed to clean will be reduced, improving cleaning time and the effectiveness of the cleaning. Moreover, having the knife 18 lift away, but not be removed from the lower assembly 14, will be the first of its type in the commercial industry.

Referring to FIGS. 9-13, the lower assembly 14 includes a lower shaft 34, a lower pulley 33, a lower bearing 35 (e.g., ball bearing), and a lower engagement portion 36. The lower shaft 34, lower pulley 33, lower bearing 35, and the lower engagement portion 36 may be coupled coaxially. For example, as shown in FIGS. 10-13, the lower shaft 34 extends through the lower pulley 33, the lower bearing 35, and the lower engagement portion 36 along the longitudinal axis 56 of the lower assembly 14. The lower pulley 33 may be disposed to enclose at least a portion of the lower bearing 35 and at least a portion of the lower engagement portion 36.

Figure 13:
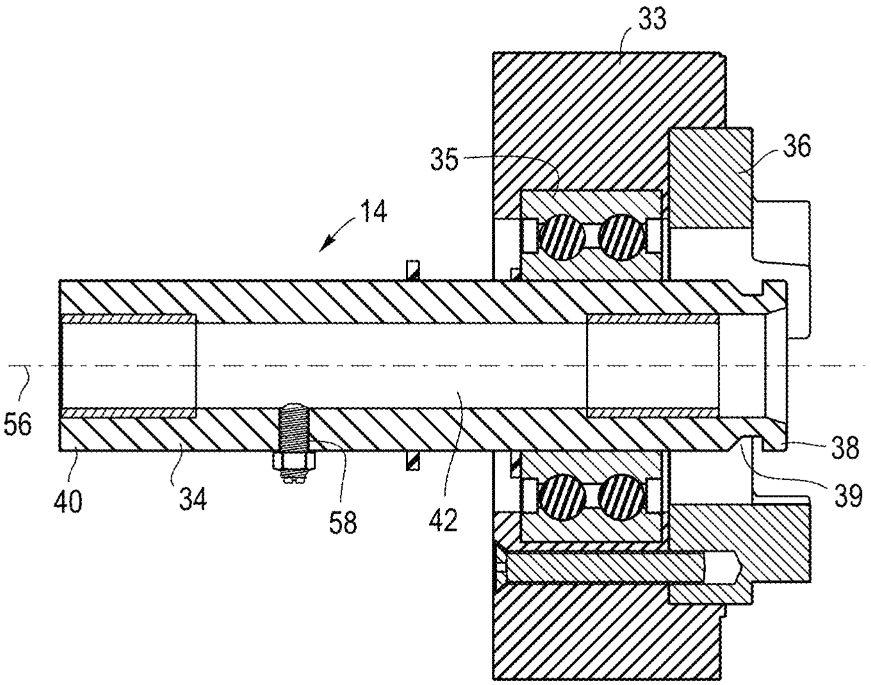
FIG. 13 is a cross-sectional view of the assembled lower assembly of FIG. 12.
Figure 14:
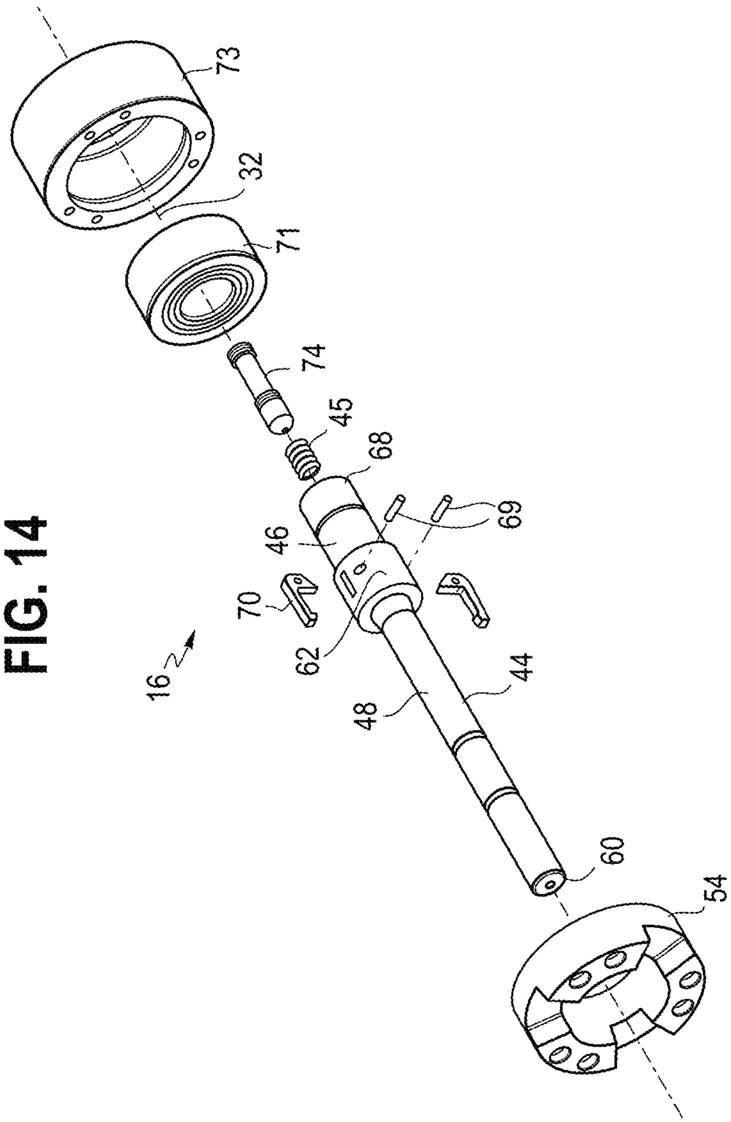
FIG. 14 is an exploded view of a portion of the upper assembly of the product slicer of FIG. 8, showing an upper engagement portion, an upper shaft, two latches, a shaft release pin, and a hub.
Figure 15:
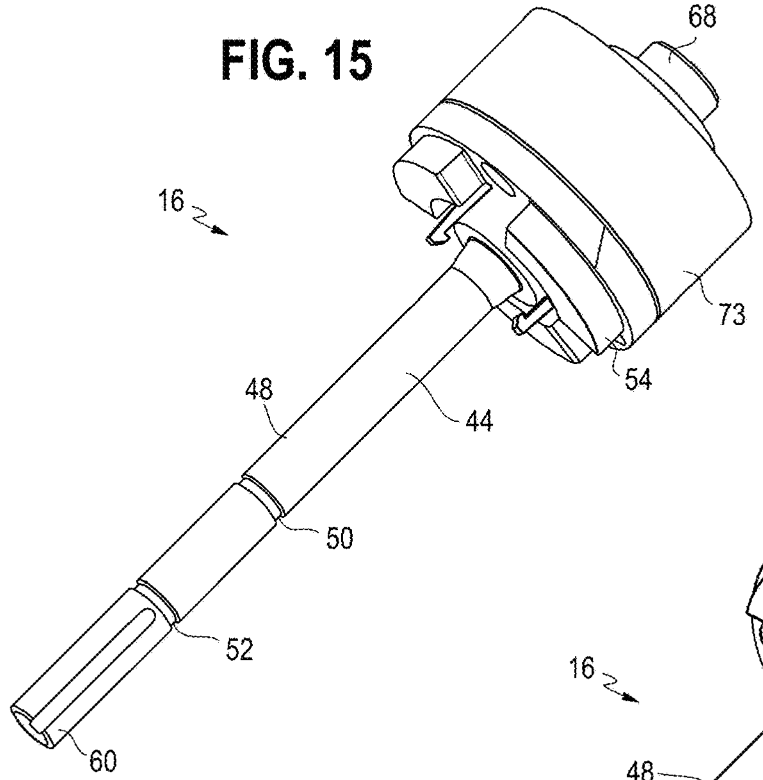
FIGS. 15-17 are perspective views of the assembled upper assembly of FIG. 8.
Figure 16:
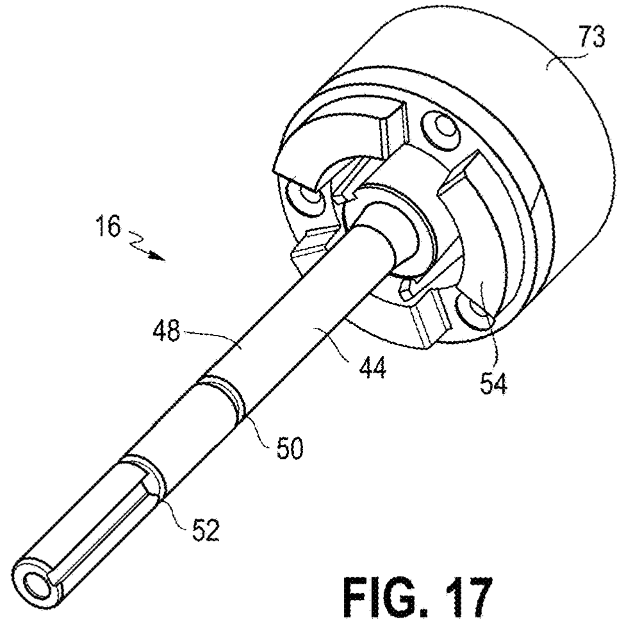
Figure 17:
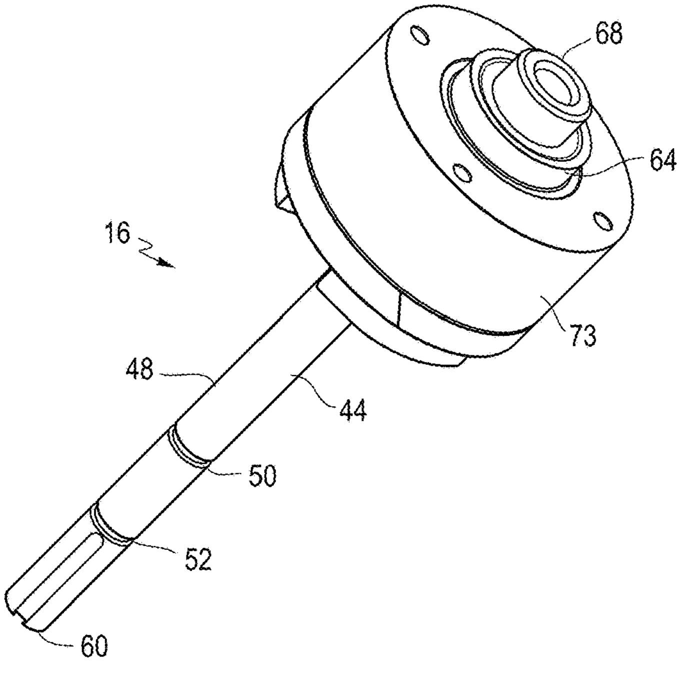
Figure 18:
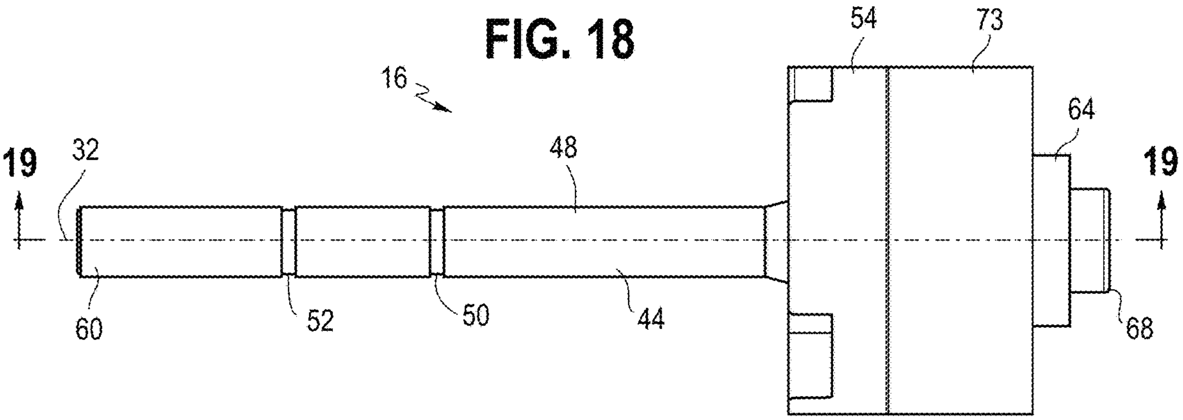
FIG. 18 is a side view of the assembled upper assembly of FIGS. 15-17.

The lower shaft 34 may have an elongated configuration and extend between a first end portion 38 and a second end portion 40. The lower shaft 34 also includes a lumen 42 extending through the lower shaft 34 between the first end portion 38 and the second end portion 40. In some embodiments, as shown in FIG. 13, the lower pulley 33, the lower bearing 35, and the lower engagement portion 36 may be disposed closer to the first end portion 38 than to the second end portion 40. The first end portion 38 may include an undercut structure 39.

Figure 19:
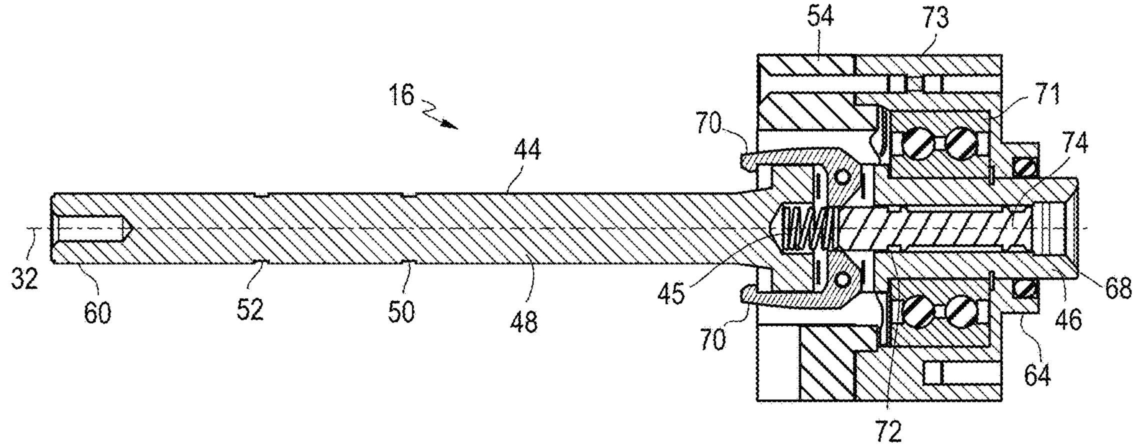
FIG. 19 is a cross-sectional view of the assembled upper assembly of FIG. 18.
Figure 22:
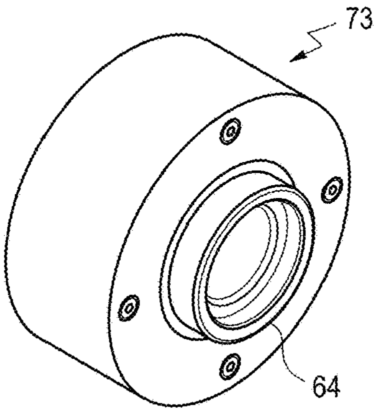
FIG. 22 is a perspective view of the hub of the upper assembly of FIG. 14.

Referring to FIGS. 14-24, the upper assembly 16 includes an upper shaft 44, an upper engagement portion 54, an upper bearing 71 (e.g., ball bearing), and a hub 73. The upper shaft 44 extends between a first end portion 60 and a second end portion 68. The upper shaft 44, the upper engagement portion 54, the upper bearing 71, and the hub 73 may be coupled coaxially. For example, as shown in FIG. 19, the upper shaft 44 extends through the upper engagement portion 54, the upper bearing 71, and the hub 73 along the longitudinal axis 32 of the upper assembly 16. In some embodiments, the hub 73 may be disposed to enclose at least a portion of the upper bearing 71, and the upper bearing 71 and the hub 73 may be disposed closer to the second end portion 68 than the upper engagement portion 54. Referring to FIG. 22, the hub 73 includes a hub protrusion 64 configured for coupling (e.g., by screwing) the knife 18 to the hub 73. The hub 73 and the upper engagement portion 54 are coupled together such that they can rotate together around the longitudinal axis 32 of the upper assembly 16.

The upper shaft 44 has a top portion 46 and an elongated portion 48. The top portion 46 and the elongated portion 48 may extend coaxially along the longitudinal axis 32 of the upper assembly 16. When the lower assembly 14 and the upper assembly 16 are coupled together, the elongated portion 48 of the upper shaft 44 extends through at least a portion of the lumen 42 of the lower shaft 34 such that the lower engagement portion 36 engages with the upper engagement portion 54. Referring to FIG. 8, the upper assembly 16 and the lower assembly 14 are configured such that when the lower pulley 33 is driven to rotate around the rotation axis 20, it causes the lower engagement portion 36 to rotate around the rotation axis 20, which causes the upper engagement portion 54, the hub 73, and the knife 18 coupled to the hub 73 to rotate around the rotation axis 20, while the upper shaft 44 does not rotate with the upper engagement portion 54.

The lower engagement portion 36 and the upper engagement portion 54 are configured to engage each other such that when the upper assembly 16 is in the initial position 24, the lower assembly 14, the upper assembly 16, and the knife 18 can be driven by a motor (not shown) to rotate together around the longitudinal axis 32 of the upper assembly 16. For example, as shown, the lower engagement portion 36 has a plurality of protrusions and recesses, and the upper engagement portion 54 has a plurality of mating protrusions and recesses, which are configured to engage each other, such that the relative movement between the lower engagement portion 36 and the upper engagement portion 54 around the longitudinal axis 32 of the upper assembly 16 is prevented, while the relative movement between the lower engagement portion 36 and the upper engagement portion 54 along the longitudinal axis 32 of the upper assembly 16 is permitted.

It will be appreciated that the configuration (e.g., shape, dimension) of the lower engagement portion 36 and the upper engagement portion 54 may be varied, as desired and/or needed, without departing from the scope of the present application, as long as the lower engagement portion 36 and the upper engagement portion 54 can be coupled together to achieve the intended purpose mentioned above.

Referring to FIGS. 15-18, the elongated portion 48 of the upper shaft 44 may include a first groove or detent 50 (although a groove is shown in the figures as an example) and a second groove or detent 52 (although a groove is shown in the figures as an example). The first groove or detent 50 and the second groove or detent 52 may be spaced apart along a length of the elongated portion 48. In some embodiments, the first groove or detent 50 and the second groove or detent 52 each may be disposed around a circumference of a portion of the elongated portion 48. The lower shaft 34 may also include a lower shaft groove or detent 58 (although a detent is shown in the figures as an example). When the elongated portion 48 of the upper shaft 44 extends through at least a portion of the lumen 42 of the lower shaft 34, the lower shaft groove or detent 58 is configured to secure the elongated portion 48 of the upper shaft 44 to the lower shaft 34 via the first groove or detent 50 or the second groove or detent 52 of the elongated portion 48 of the upper shaft 44.

Figure 28:
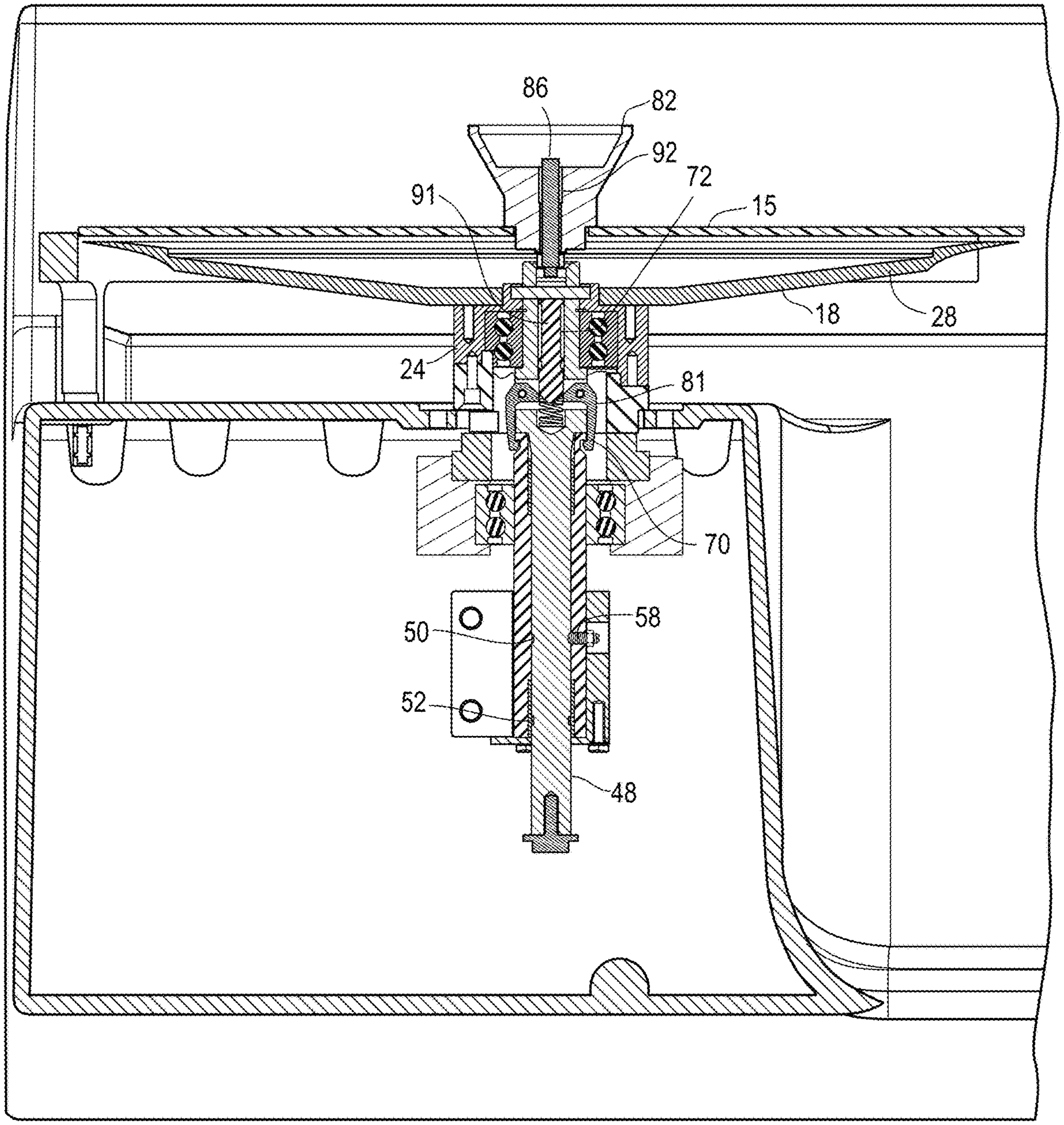
FIG. 28 is a cross-sectional view of a portion of the product slicer of FIG. 4, showing the knife in the operating position.
Figure 29:
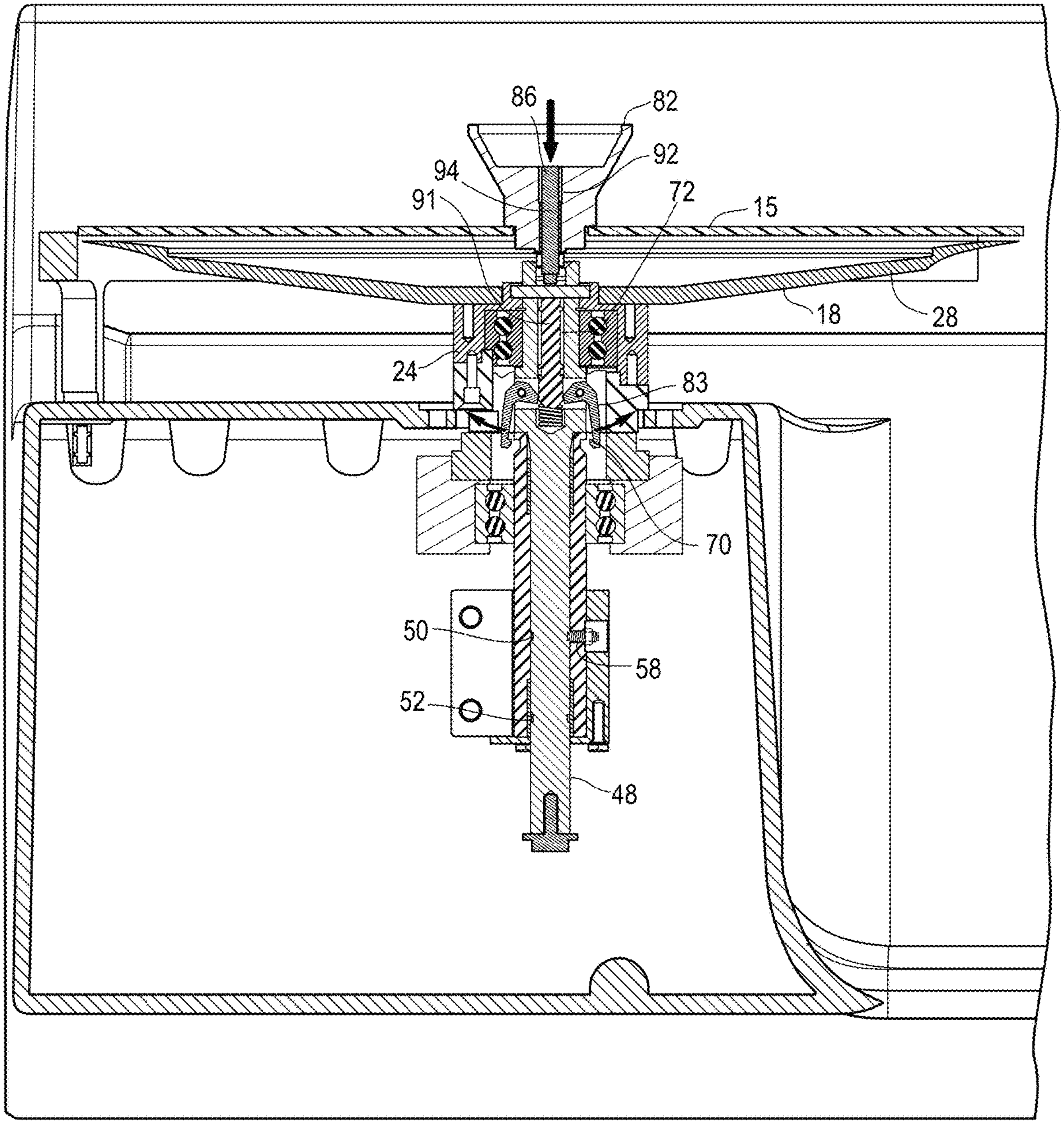
FIG. 29 is another cross-sectional view of the portion of the product slicer of FIG. 28, showing the tool release pin is pressed.
Figure 30:
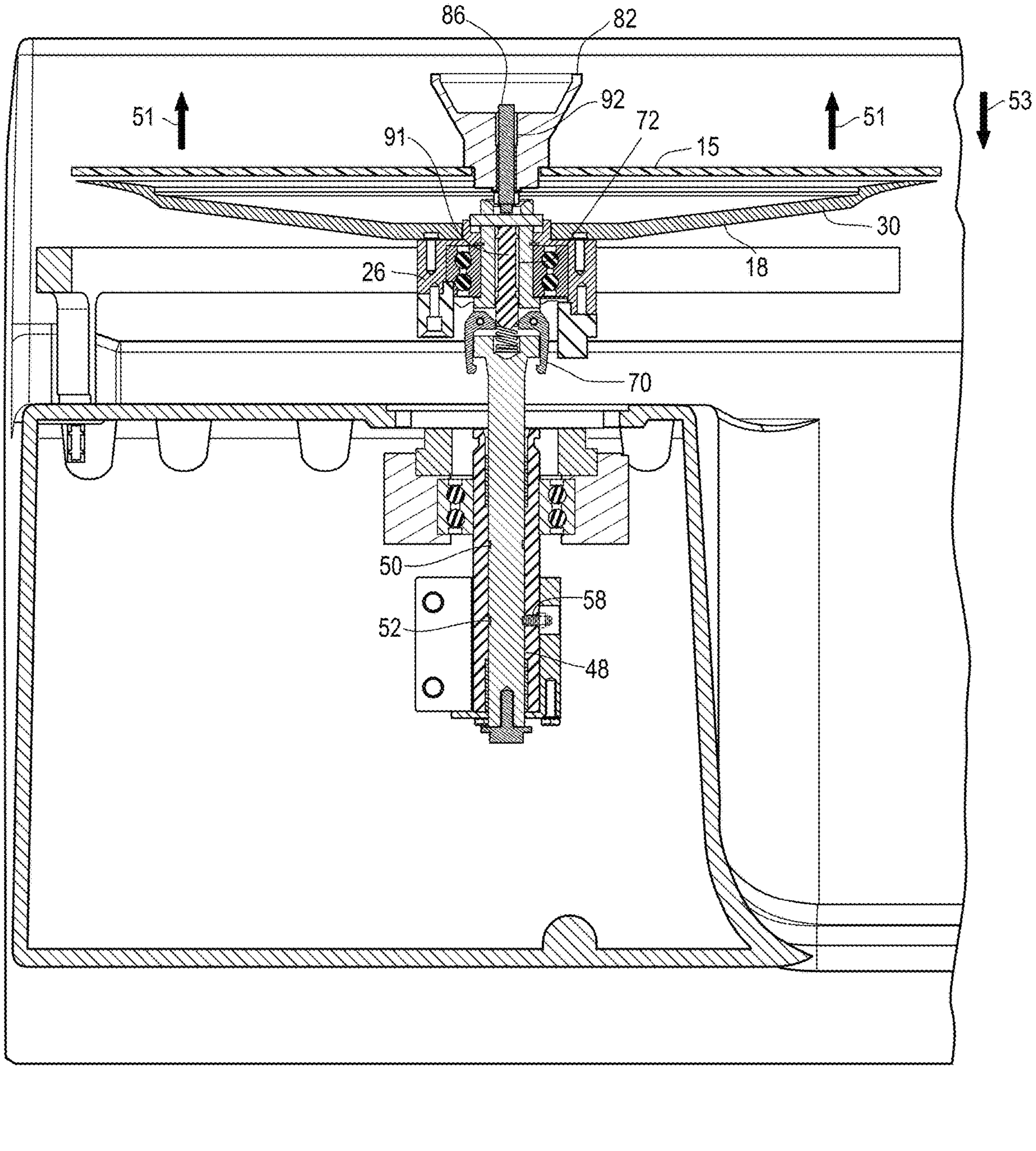
FIG. 30 is a cross-sectional view of a portion of the product slicer of FIG. 5, showing the knife in the cleaning position.
Figure 31:
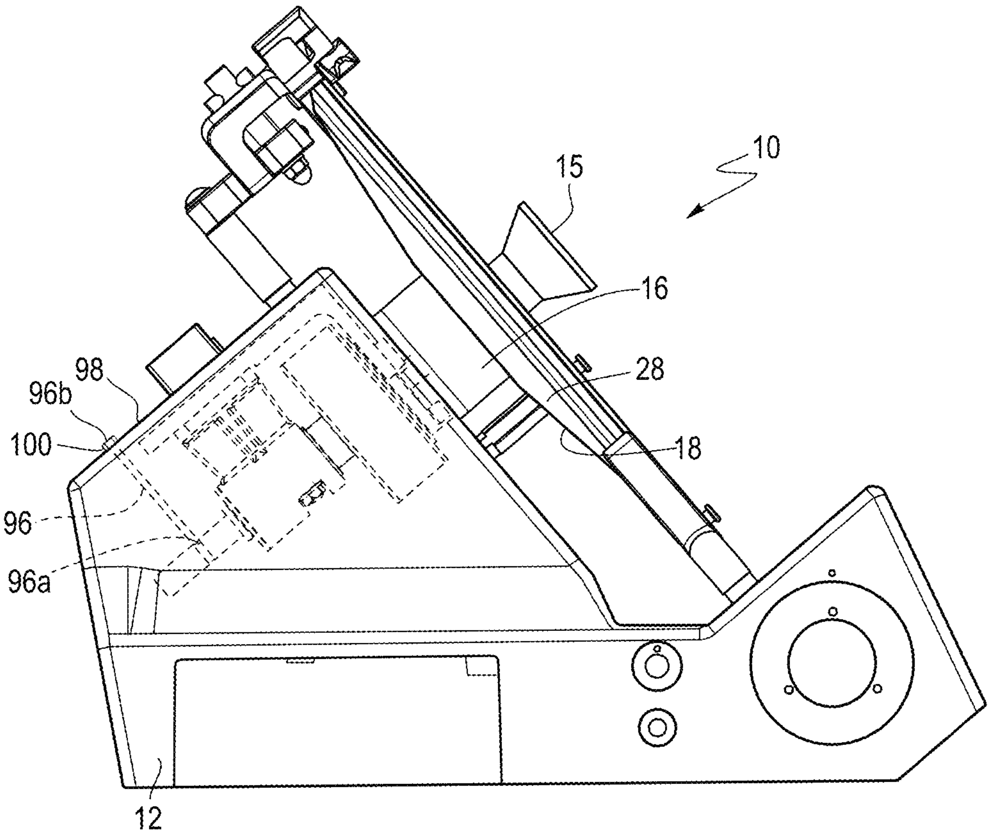
FIG. 31 is a perspective view of a portion of another embodiment of a product slicer including a safety pin, showing the knife in the operating position.
Figure 32:
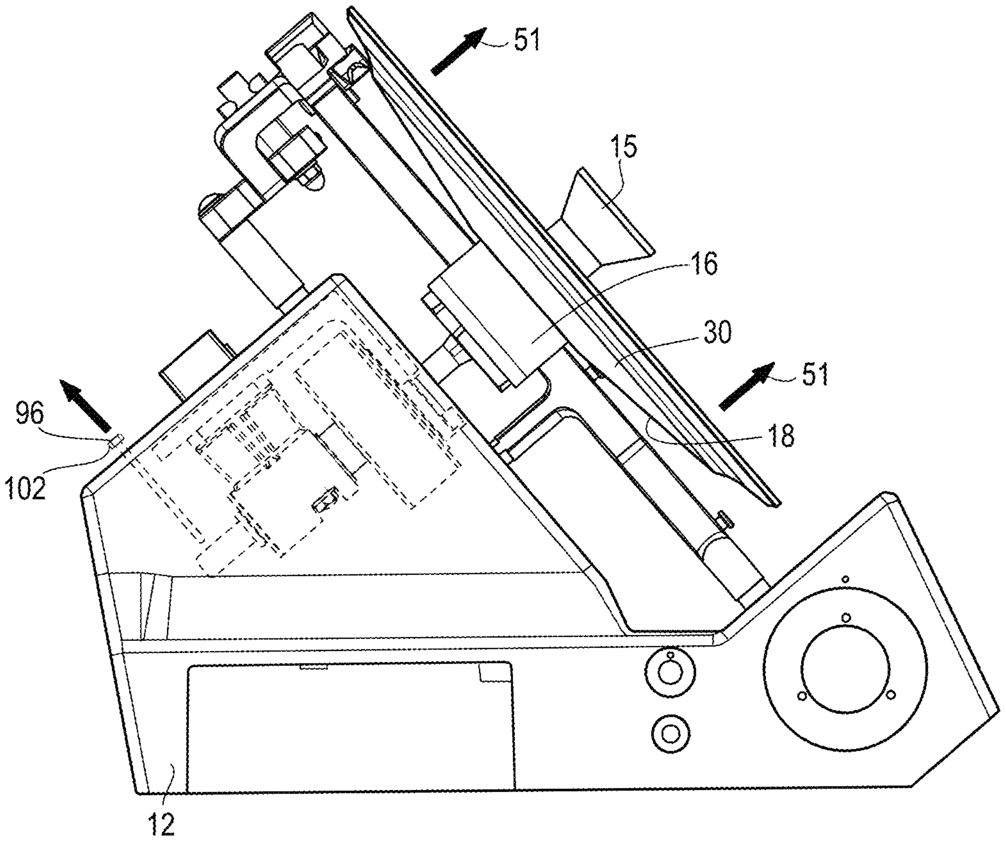
FIG. 32 is a perspective view of the portion of the product slicer of FIG. 31, showing the knife in the cleaning position.
Figure 33:
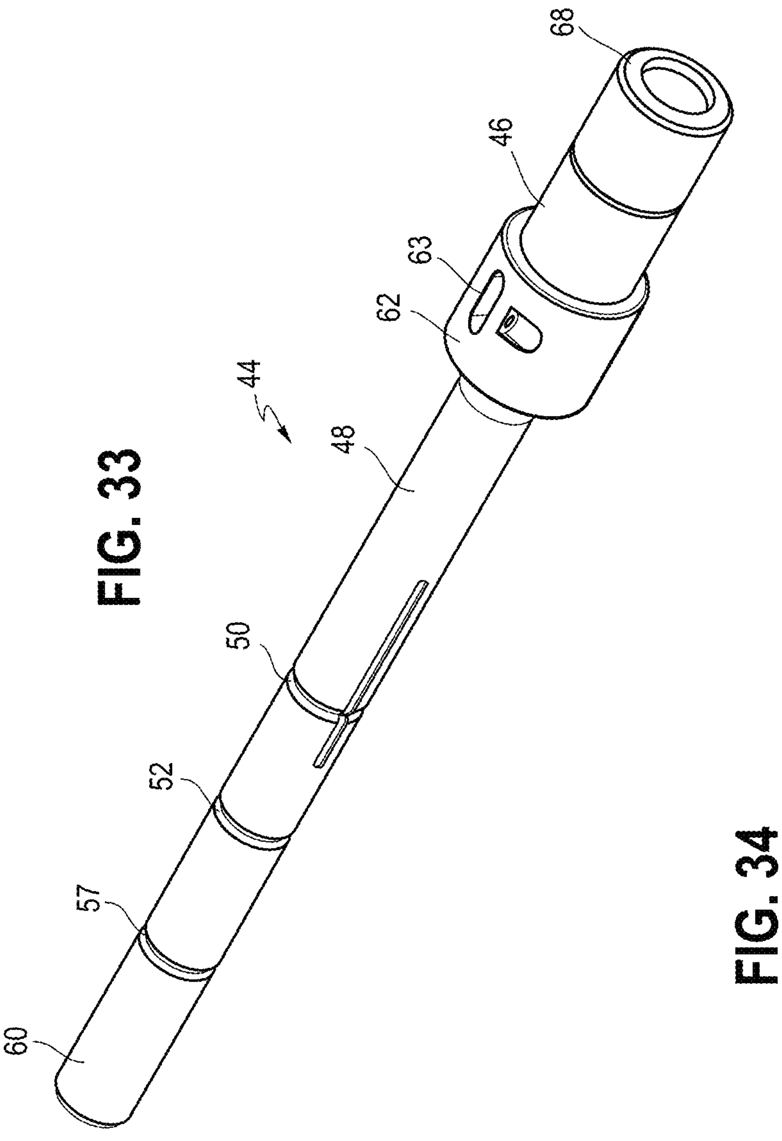
FIG. 33 is a perspective view of the upper shaft of the upper assembly of the product slicer of FIG. 31.
Figure 34:
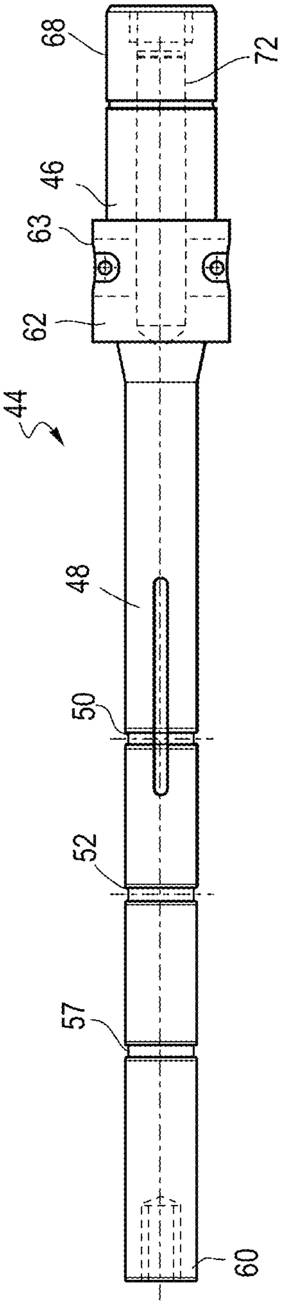
FIG. 34 is a side view of the upper shaft of FIG. 33.

For example, as shown in FIGS. 28-30 the first groove or detent 50 is configured to secure the upper assembly 16 to the initial position 24, and the second groove or detent 52 is configured to secure the upper assembly 16 to the extended position 26. When the upper assembly 16 is secured to the initial position 24 via the first groove or detent 50 and the lower shaft groove or detent 58, the upper assembly 16 may be moved in the first direction 51 away from the lower assembly 14, such that the elongated portion 48 of the upper shaft 44 moves along the longitudinal axis 32 of the upper assembly 16 until the upper assembly 16 is secured to the extended position 26 via the second groove or detent 52 and the lower shaft groove or detent 58. When the upper assembly 16 is secured to the extended position 26 via the second groove or detent 52 and the lower shaft groove or detent 58, the upper assembly 16 may be moved in the second direction 53 towards the lower assembly 14, such that the elongated portion 48 of the upper shaft 44 moves along the longitudinal axis 32 of the upper assembly 16 until the upper assembly 16 is secured to the initial position 24 via the first groove or detent 52 and the lower shaft groove or detent 58.

It will be appreciated that the number and configuration (e.g., shape, dimension) of the groove or detent of the upper assembly 16 and the lower assembly 14 may be varied, as desired and/or needed, without departing from the scope of the present application, as long as the releasably coupling between the elongated portion 48 of the upper shaft 44 and the lower shaft 34, as described above, may be achieved.

Referring to FIGS. 14 and 19-21, the upper shaft 44 also includes an intermediate portion 62 disposed between the first end portion 60 and the second end portion 68 of the upper shaft 44. The elongated portion 48 of the upper shaft 44 extends between the first end portion 60 and the intermediate portion 62. The top portion 46 of the upper shaft 44 extends between the intermediate portion 62 and the second end portion 68.

The top portion 46 of the upper shaft 44 may include a shaft lumen 72 extending between the second end portion 68 and the intermediate portion 62. A first biasing component 45 (e.g., spring) and a shaft release pin 74 may be moveably disposed in the shaft lumen 72. The intermediate portion 62 may include a pair of slots 63 disposed apart (e.g., 180 degrees apart) around the circumference of a portion of the intermediate portion 62. The pair of slots 63 may communicate with the shaft lumen 72. A pair of latches 70 may be pivotably coupled to the intermediate portion 62 (via a pin 69) and at least partially extend into the respective pair of slots 63.

Figure 23:
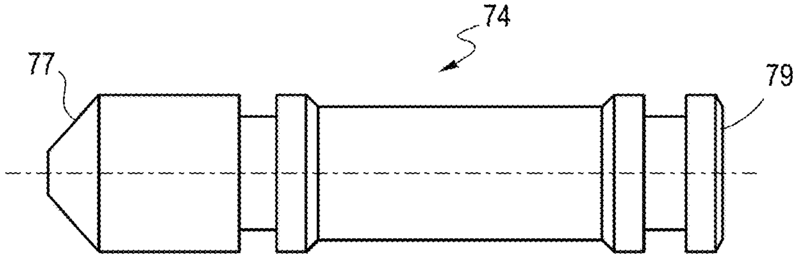
FIG. 23 is a side view of the shaft release pin of the upper assembly of FIG. 14.
Figure 24:
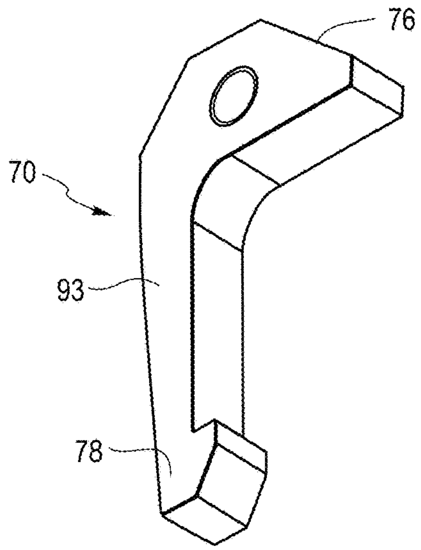
FIG. 24 is a perspective view of a latch of the upper assembly of FIG. 14.
Figure 25:
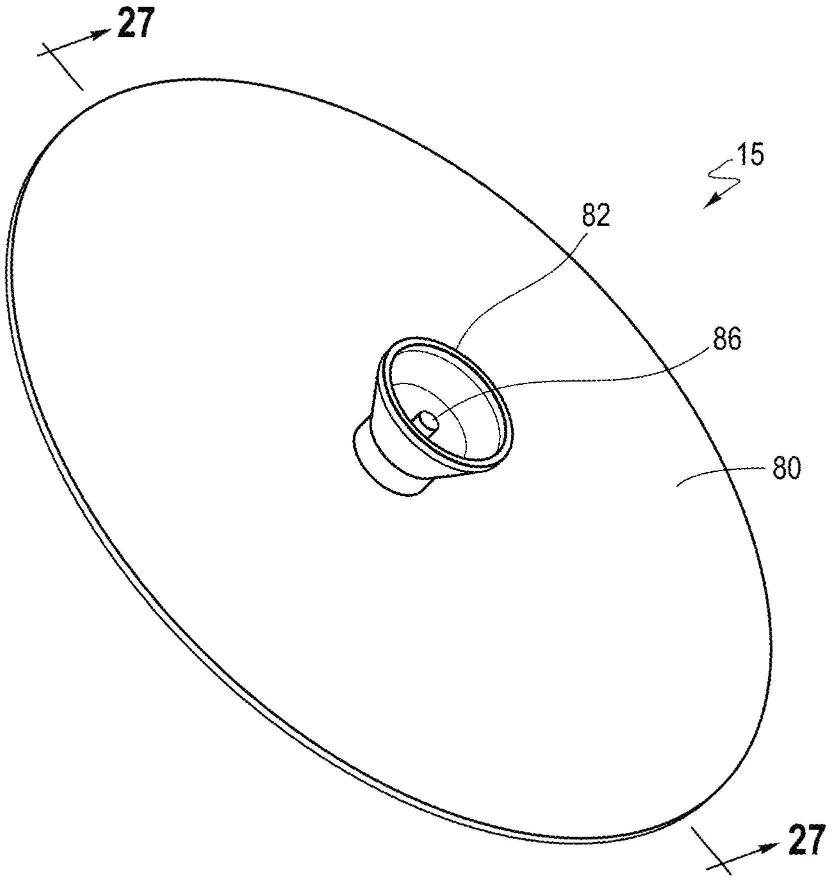
FIG. 25 is a perspective view of the telescoping tool assembly of FIG. 8.

Referring to FIGS. 19, 23, and 24, the shaft release pin 74 extends between a first end 77 and a second end 79. The shaft release pin 74 is configured to be moveably disposed in the shaft lumen 72 with the first end 77 contacting the first biasing component 45 in the intermediate portion 62. The shaft release pin 74 is movable along the longitudinal axis 32 of the upper assembly 16. The latch 70 may include a head portion 76, a hook portion 78, and an arm portion 93 extending between the head portion 76 and the hook portion 78. The head portion 76 is configured to at least partially extend into the slot 63 and pivotably coupled to the intermediate portion 62.

The latch 70 is configured to releasably couple the upper assembly 16 to the first end portion 38 of the lower shaft 34 (e.g., via the mating configuration of the hook portion 78 and the undercut structure 39 of the lower shaft 34). The shaft release pin 74 is configured to be movable to pivot the latch 70, causing the latch 70 to move between a default position 81 (e.g., as shown in FIG. 28) and a pivoted position 83 (e.g., as shown in FIG. 29). Referring to FIGS. 28 and 29, in some embodiments, when the shaft release pin 74 pivots the latch 70 to move from the default position 81 to the pivoted position 83, it releases the latch 70 from engagement with the lower assembly 14.

In some embodiments, for example, as shown in FIGS. 23 and 24, the first end 77 of the shaft release pin 74 and the head portion 76 may have mating configurations, such that when the shaft release pin 74 moves towards the lower assembly 14, the first biasing component 45 will be pressed, and the head portion 76 will be pivoted by the first end 77 of the shaft release pin 74, allowing the hook portion 78 disengages from the undercut structure 39 of the lower shaft 34, such that the latch 70 is released from engagement with the lower assembly 14, thereby allowing the upper assembly 16 to move along the longitudinal axis 32 of the upper assembly 16 relative to the lower assembly 14 (e.g., between the initial position 24 and the extended position 26).

It will be appreciated that the number and configuration (e.g., shape, dimension) of the slots 63 and the latches 70, and the configuration (e.g., shape, dimension) of the shaft release pin 74 and the first end portion 38 of the lower shaft 34 may be varied, as desired and/or needed, without departing from the scope of the present application, as long as the shaft release pin 74 is movable to move/pivot the latch 70 to engage with or disengage from the first end portion 38 of the lower shaft 34, as discussed above.

Referring to FIGS. 4, 5, and 25-30, a telescoping tool assembly 15 is provided. The telescoping tool assembly 15 is configured to be releasably coupled to the upper assembly 16, and to move the knife 18 and the upper assembly 16 together relative to the lower assembly 14. As discussed in greater detail below, the telescoping tool assembly 15 is configured to move the knife 18 between the operating position 28 and the cleaning position 30.

Figure 26:
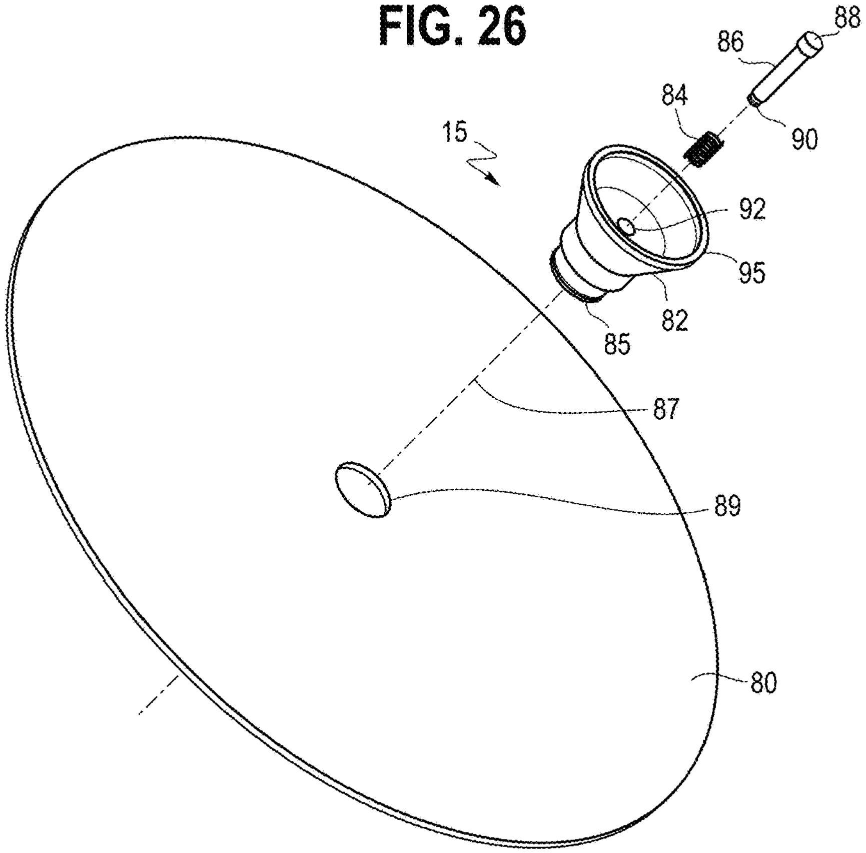
FIG. 26 is an exploded view of a portion of the telescoping tool assembly of FIG. 25.
Figure 27:
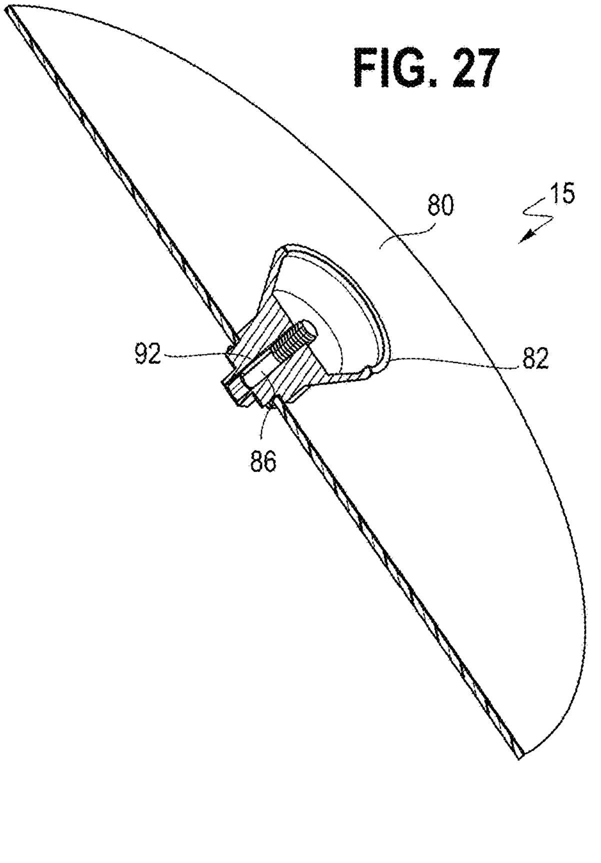
FIG. 27 is a partial cross-sectional view of the telescoping tool assembly of FIG. 25.

In some embodiments, as shown in FIGS. 26 and 27, the telescoping tool assembly 15 includes a plate 80, a knob 82, a second biasing component 84 (e.g., spring), and a tool release pin 86 that are coupled together and extend coaxially along a longitudinal axis 87 of the telescoping tool assembly 15. The plate 80 may be configured to have the same circular configuration as the knife 18, with a slightly larger diameter. The slightly larger diameter of the plate 80 is advantageous for protecting a user from being injured by the knife 18 during the cleaning process when using the telescoping tool assembly 15, as discussed below. The knob 82 includes a holding portion 95 and a connecting portion 85, and a knob lumen 92 extending between the holding portion 95 and the connecting portion 85. The tool release pin 86 extends between a first end 88 and a second end 90.

When assembled, the connecting portion 85 extends through an aperture 89 of the plate, and the tool release pin 86 moveably extends into the knob lumen 92 with the second end 90 of the tool release pin 86 contacting the second biasing component 84 disposed in the knob lumen 92. As discussed in greater detail below, the telescoping tool assembly 15 may be coupled to the upper assembly 16 via the connecting portion 85 of the knob 82. For example, the connecting portion 85 may be screwed on to the second end portion 68 of the upper shaft 44. The knob lumen 92 communicates with the shaft lumen 72 of the upper shaft 44, and the tool release pin 86 is configured to move the shaft release pin 91 to release the latch 70 from engagement with the lower assembly 14.

Referring to FIGS. 1-5 and 28-30, the method of using the telescoping tool assembly 15 to move the knife 18 between the operating position 28 and the cleaning position 30 will be described. For example, when a slicing operation is done, and a user would like to clean the slicer, the user may remove the knife cover 22 and then couple the telescoping tool assembly 15 to the upper assembly 16, as discussed above. The user may hold the knob 82 and push the tool release pin 86 towards the knife 18 to a pressed position 94 (e.g., as shown in FIG. 29). When the tool release pin 86 is pressed, it pushes the shaft release pin 91 towards the lower assembly 14, such that the latch 70 will be pivoted to at least partially disengage from the first end portion 38 of the lower shaft 34, such that at least partially release the upper assembly 16 from engagement with the lower assembly 14, thereby the knife 18 can be moved from the operating position 28 to the cleaning position 30.

To move the knife 18 from the operating position 28 to the cleaning position 30, the user may hold the tool release pin 86 at the pressed position 94 and pull the knife 18 away from the lower assembly 14 (e.g., in the first direction 51, as shown in FIG. 30). When the knife 18 reaches the cleaning position 30, the upper assembly 16 is secured to the lower assembly 14 in the extended position 26. The user may release the tool release pin 86 and clean the slicer. When the cleaning process is done, to move the knife 18 from the cleaning position 30 to the operating position 28, the user may push the knife 18 back towards the lower assembly 14 by grasping and pushing the knob 82 (e.g., in the second direction 53, as shown in FIG. 30). When the knife 18 reaches the operating position 28, the upper assembly 16 is secured to the lower assembly 14 in the initial position 24. Then the user may remove the telescoping tool assembly 15 from the upper assembly 16 (e.g., by unscrewing the knob 82 from the upper assembly 16).

In some embodiments, the slicer 10 is configured to disable a slicing function in response to detecting the knife cover 22 is removed from the slicer 10. For example, the slicer 10 may be provided with a sensor that detects the removal of the knife cover 22, such that if the knife cover 22 is removed, the control board of the slicer disables the start button of the slicer until the knife 18 is back in its operating position and the knife cover 22 is installed on the knife 18 again.

Another embodiment of the telescoping slicer 10 is described with reference to FIGS. 31-38. For the sake of brevity, the similar or same structures and functions of the slicer that have been discussed above will not be repeated again, including but not limited to the configuration of the lower assembly 14, the upper assembly 16, the knife 18, the knife cover 22, and the telescoping tool assembly 15, and how to use the telescoping tool assembly 15 to move the knife 18 between the operating position and the cleaning position. A person of ordinary skill in the art will understand, by reading the specification above, how the main components of the slicer 10 in FIGS. 31-38 are configured and used.

Figure 35:
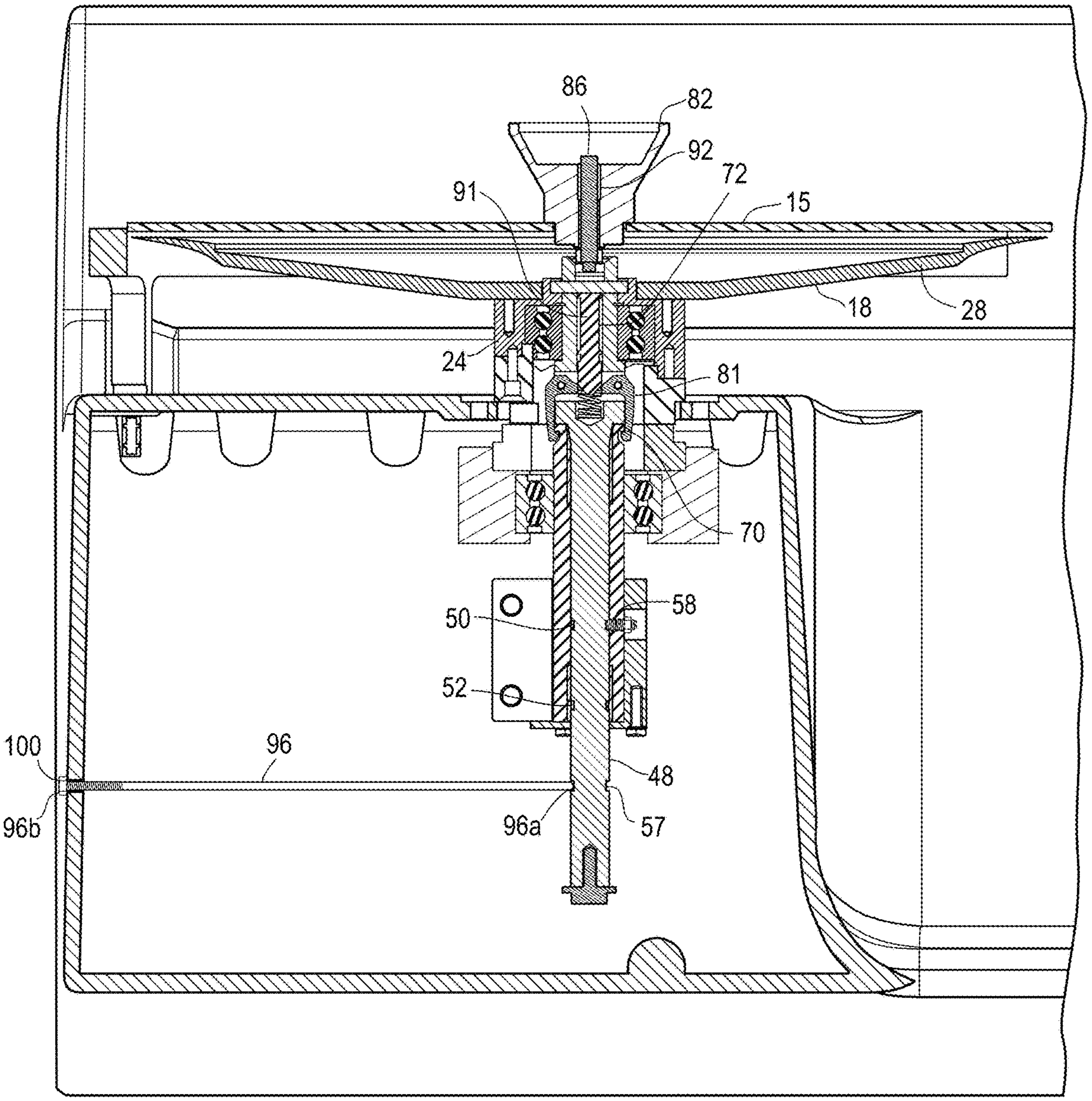
FIG. 35 is a cross-sectional view of a portion of the product slicer of FIG. 31, showing the knife in the operating position.
Figure 36:
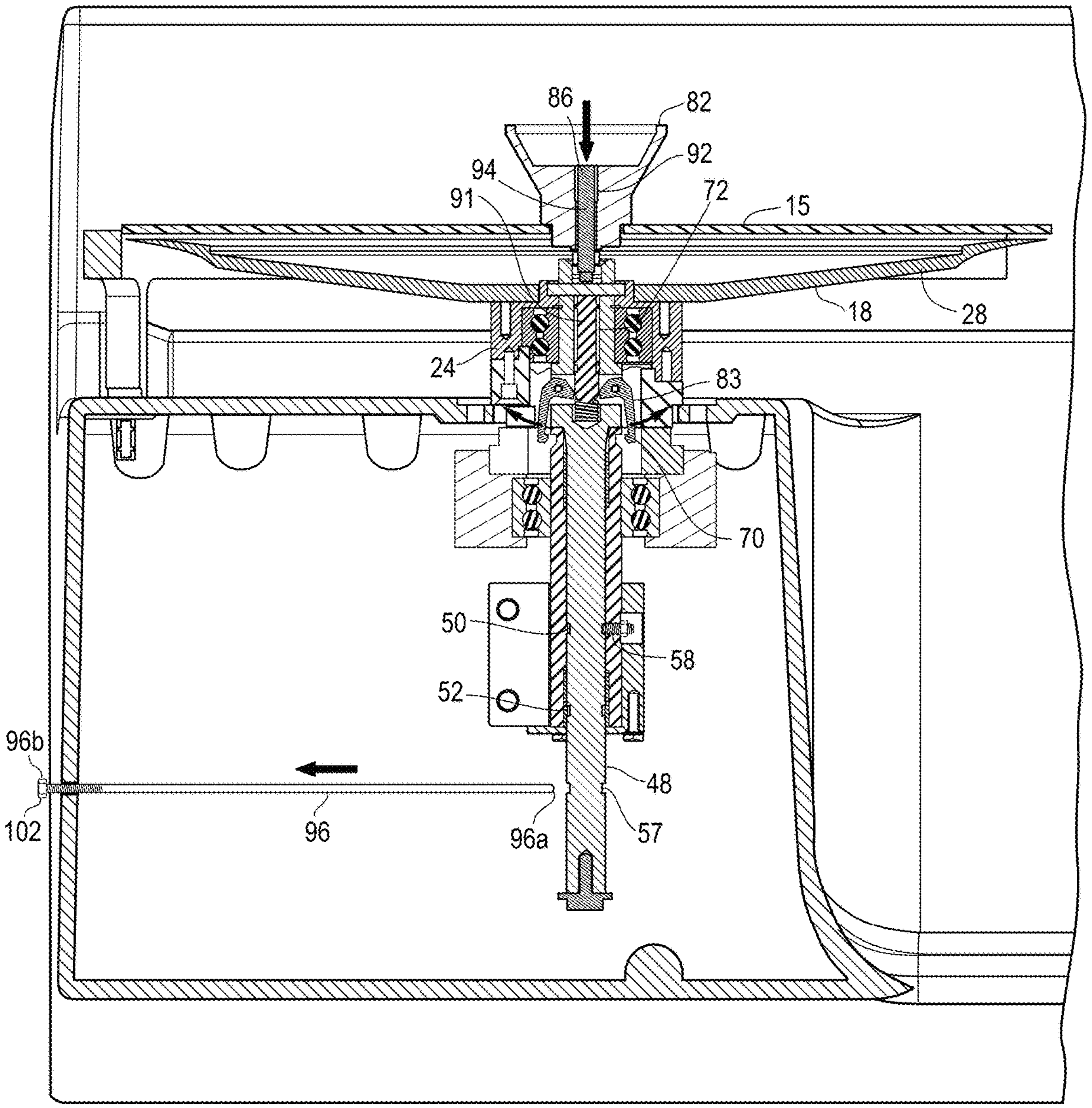
FIG. 36 is another cross-sectional view of the portion of the product slicer of FIG. 35, showing the safety pin is pulled up and the tool release pin is pressed.
Figure 37:
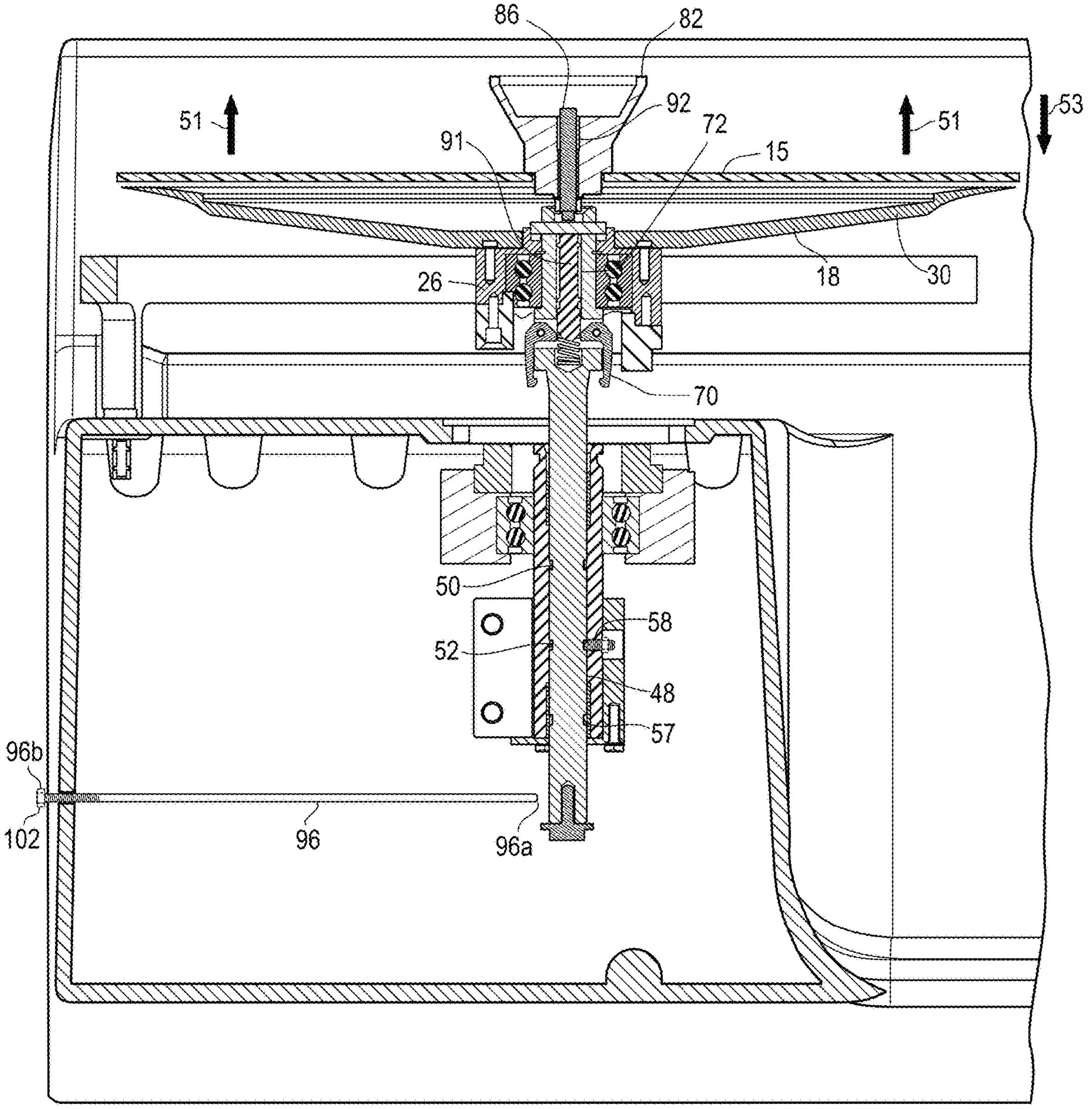
FIG. 37 is a cross-sectional view of a portion of the product slicer of FIG. 32, showing the knife in a cleaning position.
Figure 38:
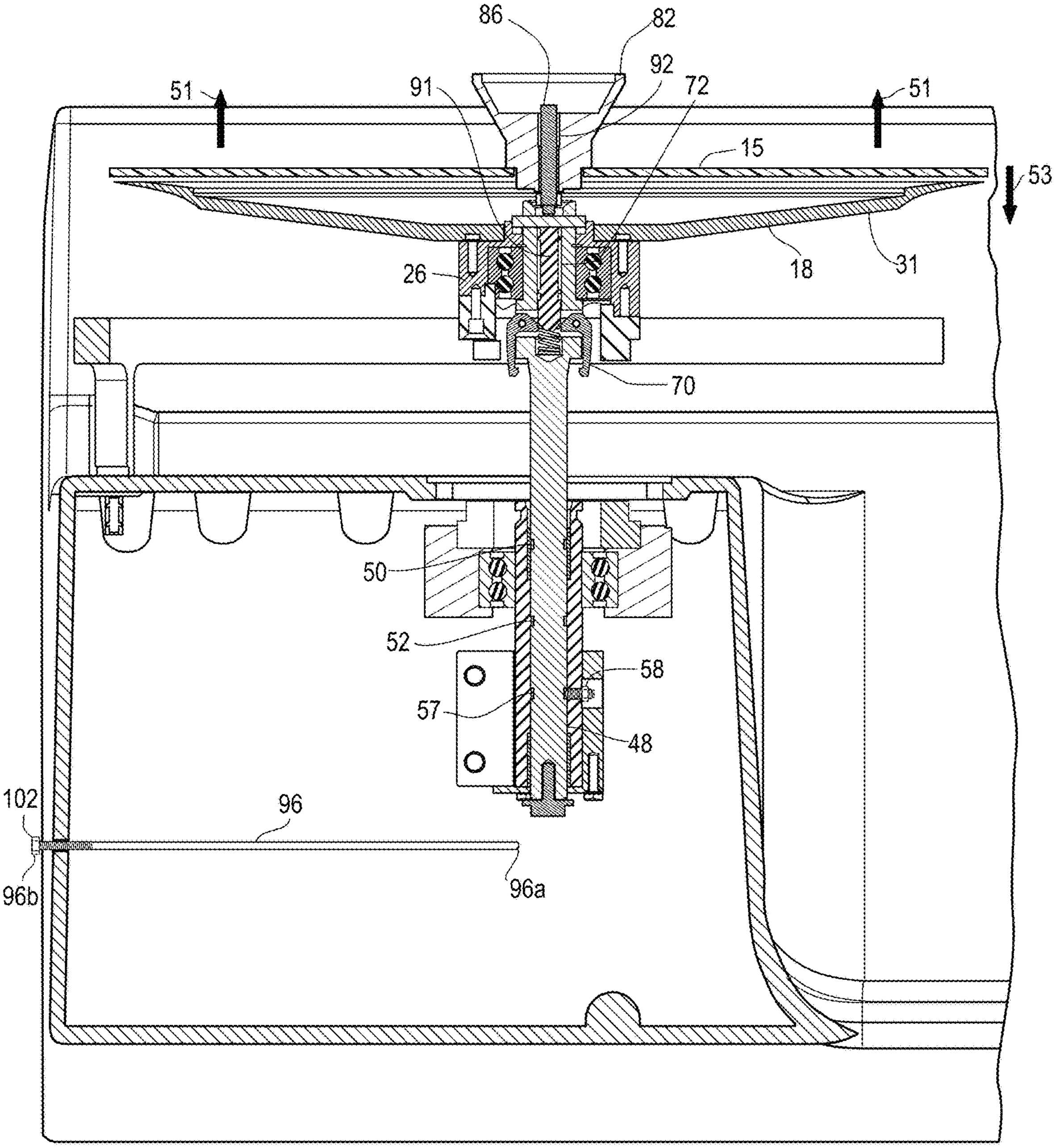
FIG. 38 is another cross-sectional view of the portion of the product slicer of FIG. 35, showing the knife in an extended cleaning position.
Figure 39:
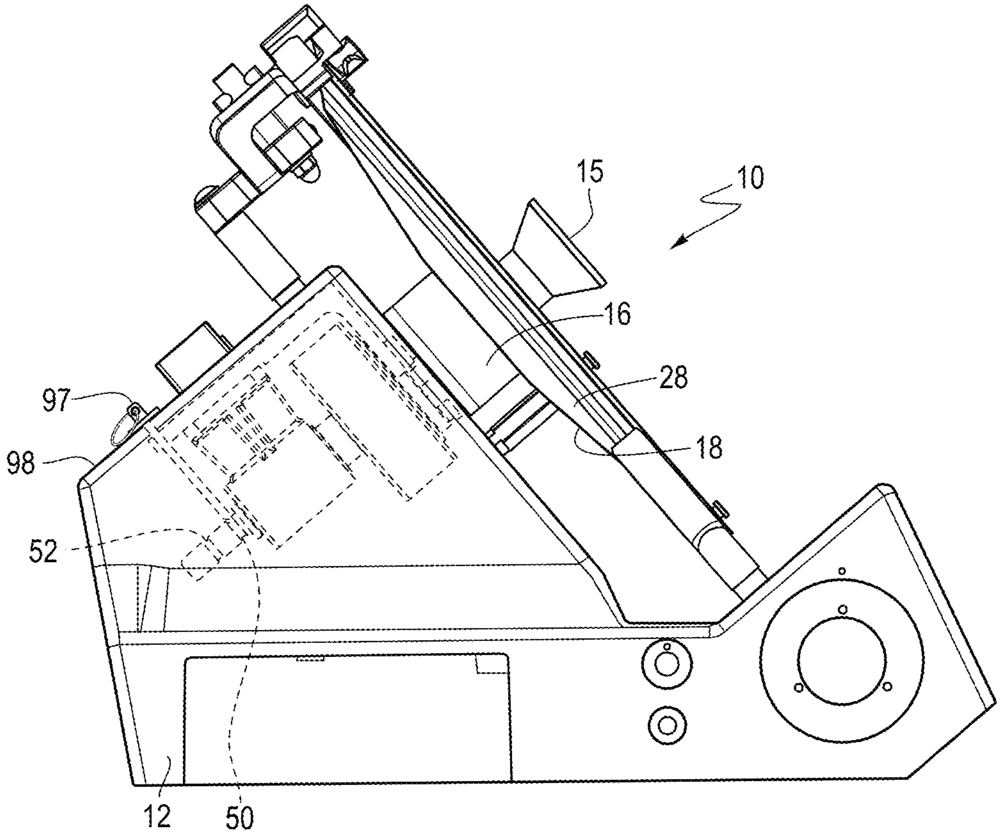
FIG. 39 is a perspective view of a portion of another embodiment of a product slicer including an external pin, showing the knife in the operating position.
Figure 40:
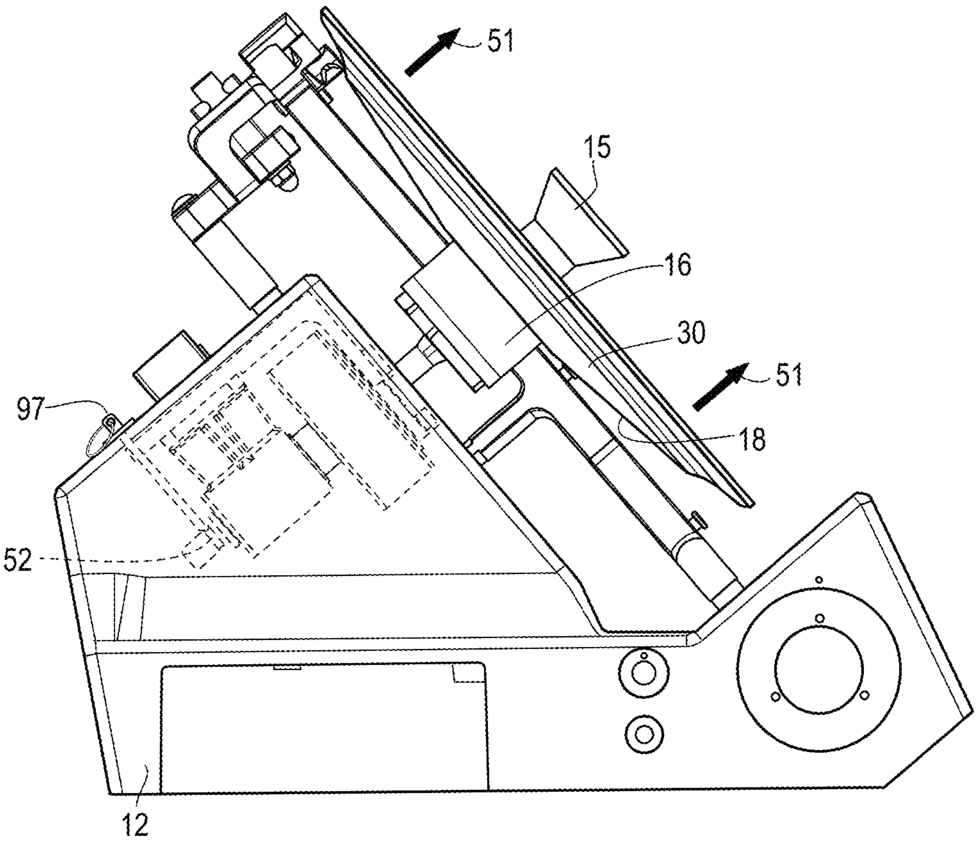
FIG. 40 is a perspective view of the portion of the product slicer of FIG. 39, showing the knife in the cleaning position.
Figure 41:
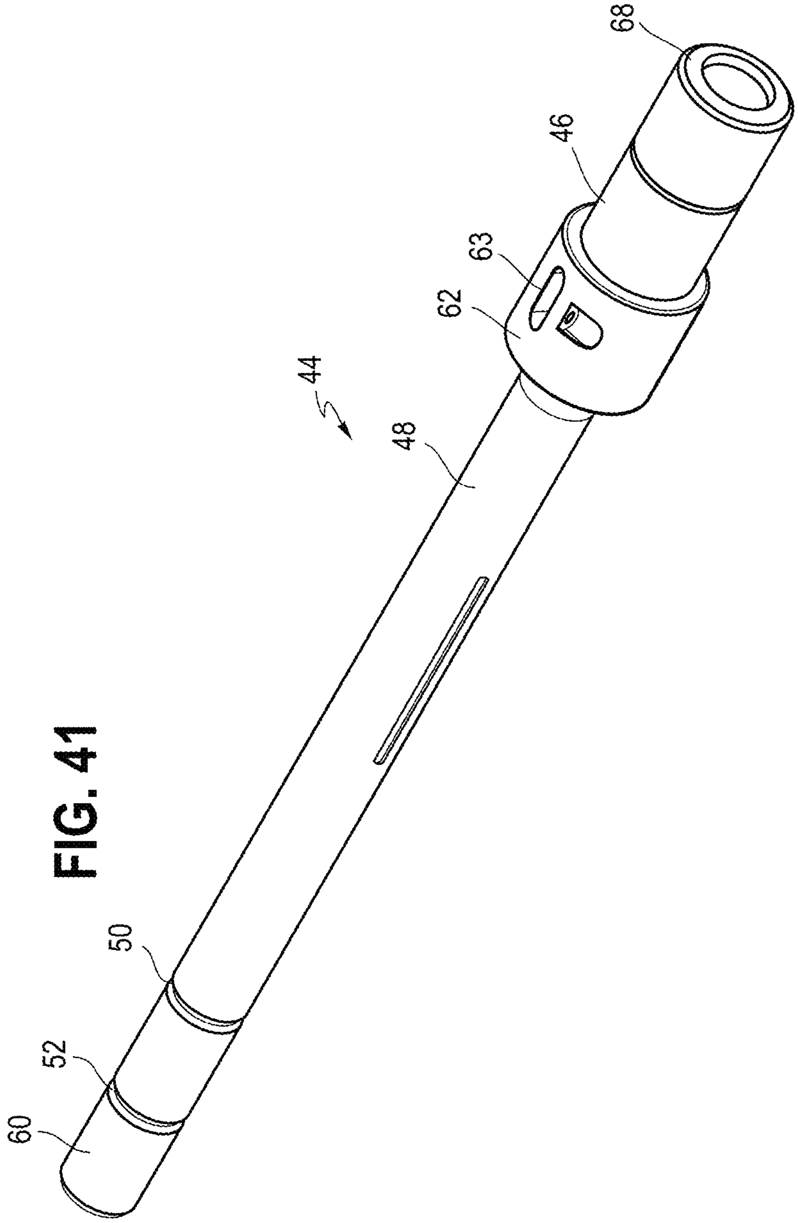
FIG. 41 is a perspective view of the upper shaft of the upper assembly of the product slicer of FIG. 39.
Figure 42:
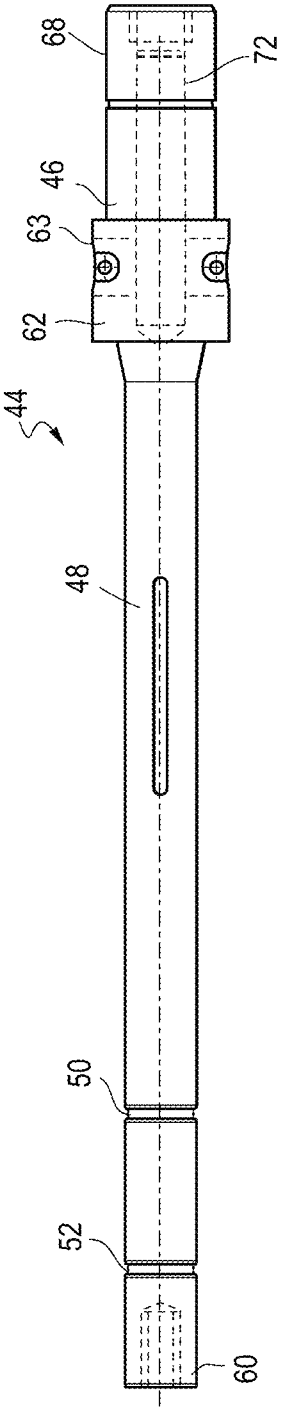
FIG. 42 is a side view of the upper shaft of FIG. 41.

As shown in FIGS. 31-38, the upper shaft 44 of the upper assembly 16 of the slicer 10 includes a third groove 57 in addition to the first and second grooves 50 and 52, as discussed above. The third groove 57 is disposed closer to the first end portion 60 of the upper shaft 44 than the first and second grooves 50 and 52. The slicer 10 also includes a safety pin 96 extending through a portion of a housing 98 of the slicer 10 and into the internal space of the housing. The safety pin 96 extends between a first end 96*a* and a second end 96*b*, and is configured to move between a locked position 100 (e.g., as shown in FIG. 35), where the first end 96*a* extends into the third groove 57 and an unlocked position 102 (e.g., as shown in FIGS. 36-38), where the first end 96*a* is pulled out of the third groove 57.

The safety pin 96 is configured to add a safety feature to the slicer 10. When the safety pin 96 is in the locked position 100, it prevents the knife 18 from being moved from the operating position 28 to the cleaning position 30. To use the telescoping tool assembly 15 to move the knife 18, before taking the steps discussed above, the user needs to first pull the safety pin 96 up to the unlocked position 102. The safety pin 96 is configured to stay in the unlocked position 102 until a user pushes it back to the locked position 100. Then the user may take the steps discussed above to use the telescoping tool assembly 15 to move the knife 18. The safety pin 96 provides a safety feature to the slicer 10 to prevent accidental movement of the knife 18.

In some embodiments, the safety pin 96 may be configured such that when the safety pin 96 is not in the locked position 100 (e.g., when the safety pin 96 is in the unlocked position 102 or when the first end 96*a* of the safety pin 96 disengages from the third groove 57), the slicer 10 cannot be started to perform the slicing operation (e.g., by disabling the start button). This configuration is advantageous for reducing the chance of accidental user injury during the cleaning process. When the user moves the knife 18 back to the operating position 28, the user needs to push the safety pin 96 back to the locked position 100 such that the slicing operation can be performed.

This safety feature may be achieved via any suitable mechanisms. As one non-limiting example, a sensor may be placed in the slicer 10 and configured to detect the movement/position of the safety pin 96 or 97 or the knife 18 (e.g., the associated elongated portion 48 of the upper shaft 44), forming an interlock in communication with the motor such that the motor will not operate the knife unless the knife is in the operating position, or the safety pin 96 (or 97) in the locked position. As another non-limiting example, the mechanical safety feature provided by the pin 96 or 97 and associated structures identified (with reference to FIGS. 31-45) may be supplemented by a sensor in communication with the pin or an associated feature and the motor, such that the motor will not be operable (e.g., will not receive power, or another control condition) unless the knife is in the operating position, with the safety pin 96 (or 97) in the locked position.

Figure 35A:
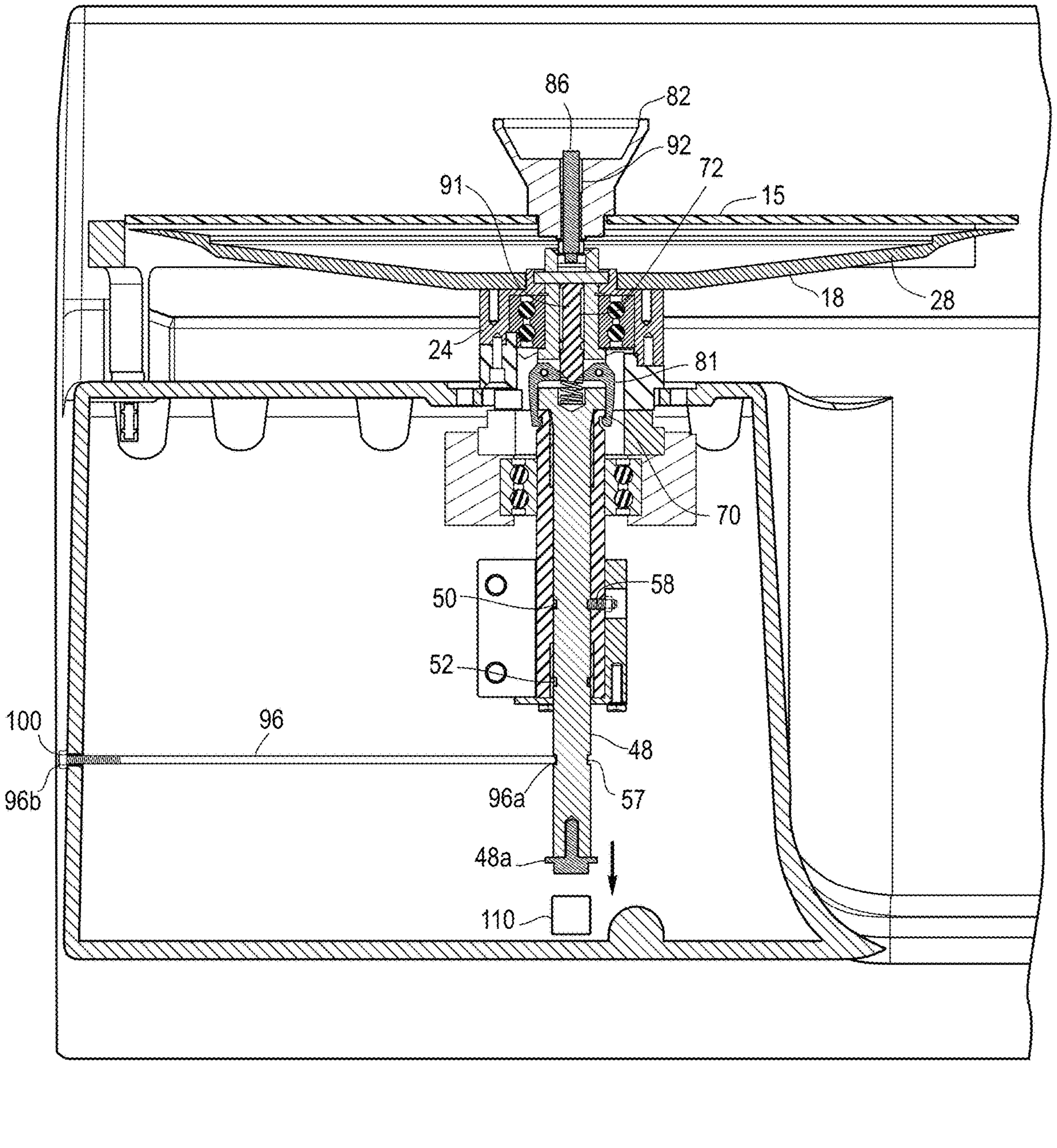
FIGS. 35A-35E are example illustrations showing a sensor/switch associated with a portion of the product slicer of FIG. 35.
Figure 35B:
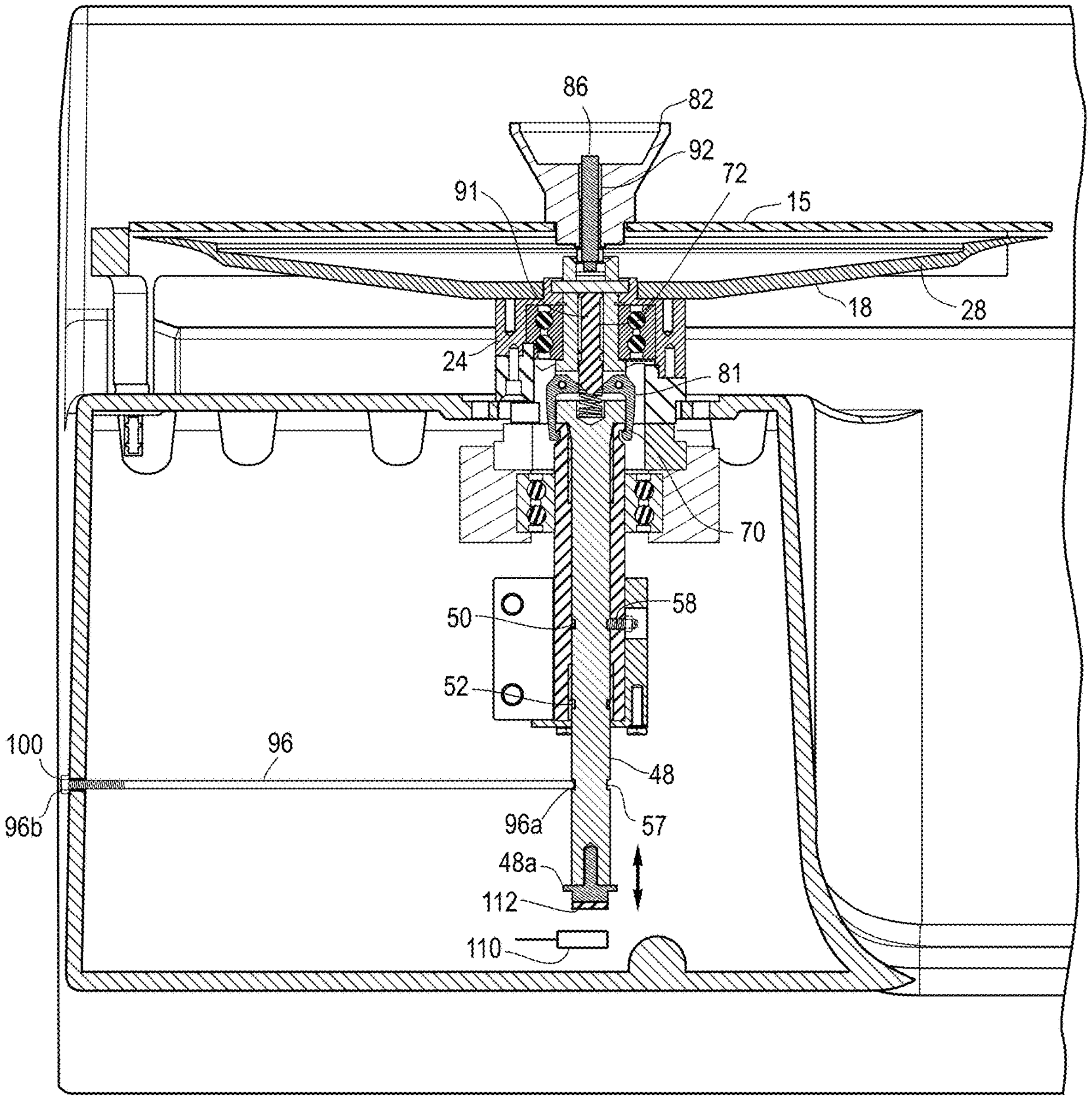
Figure 35C:
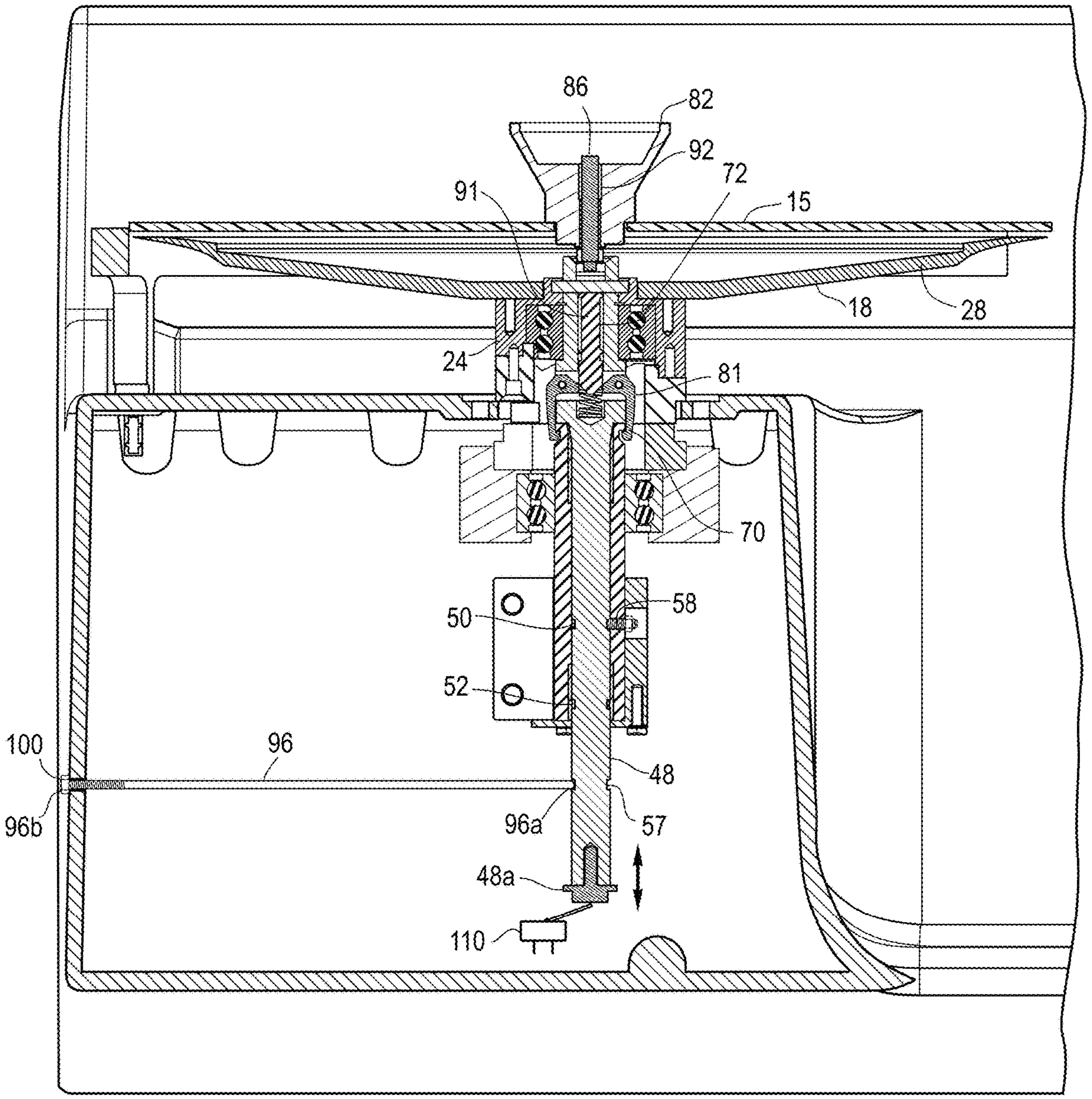
Figure 35D:
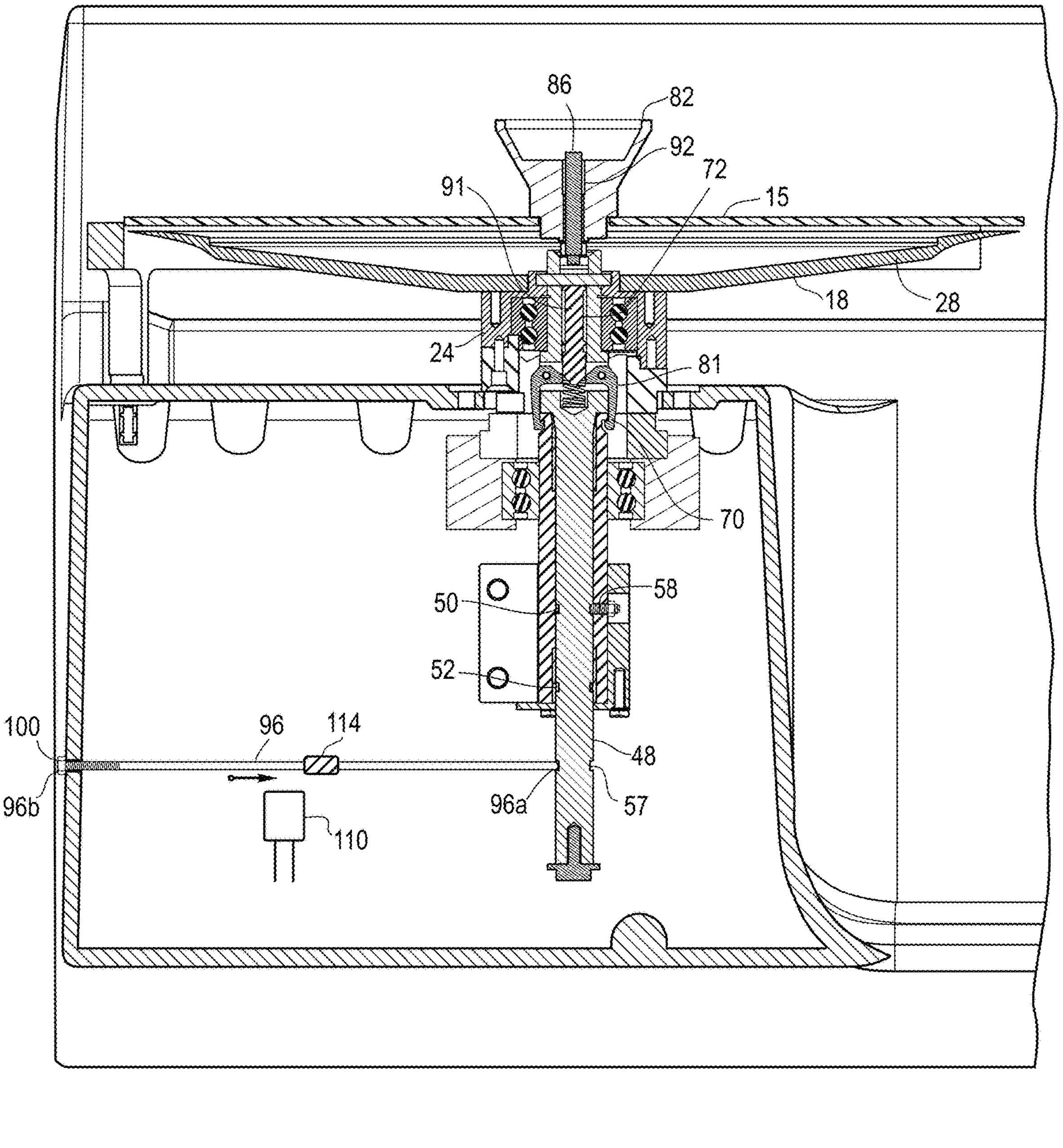
Figure 35E:
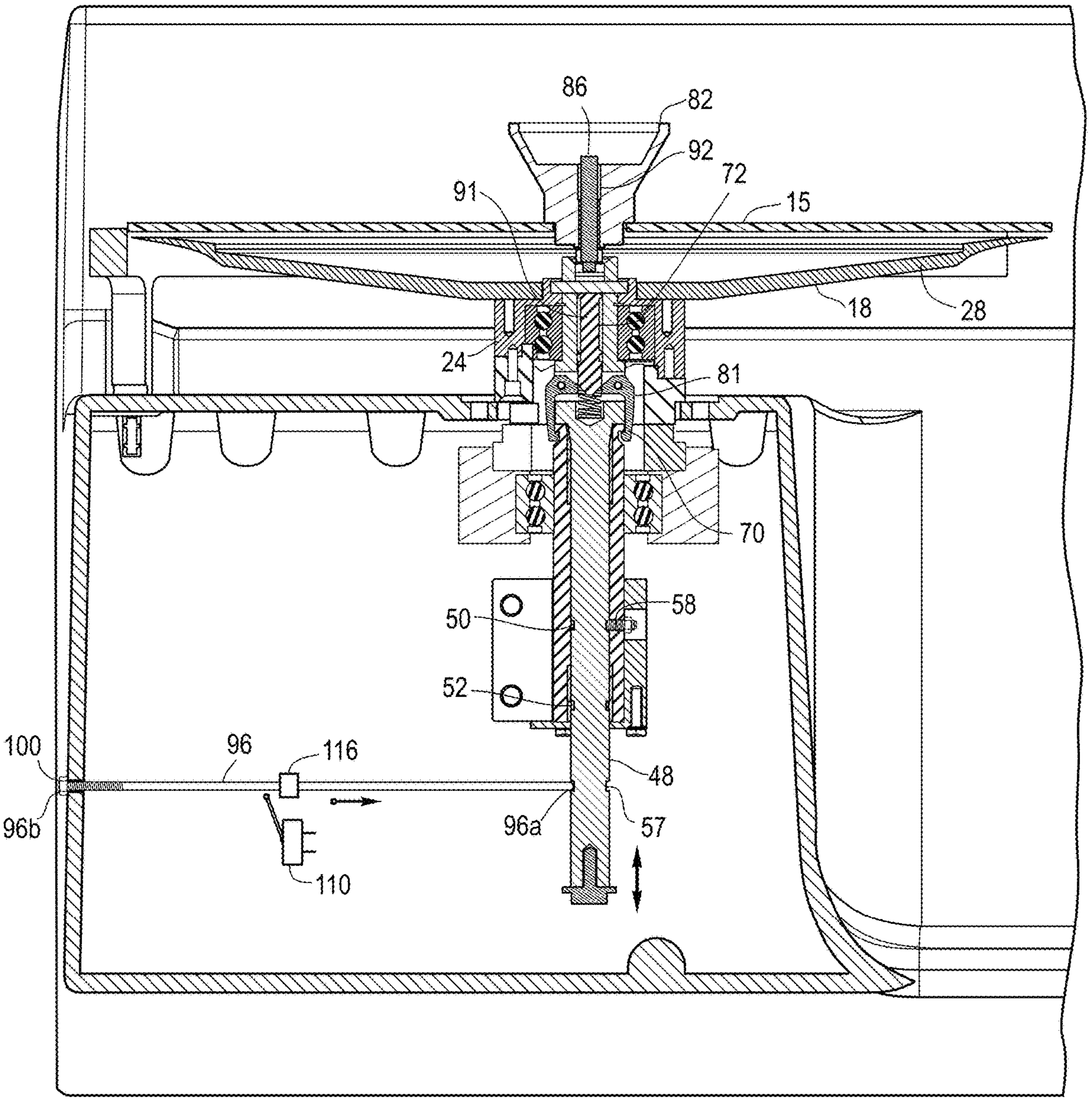

FIGS. 35A-35E provide some example non-limiting illustrations of sample locations for the sensor/switch to be located, and which component(s)/position(s) will be detected to enable/disable operation. Although the illustrations are provided using the embodiment shown in FIG. 35, it will be appreciated that the same or similar sensor detection mechanisms may be provided in other embodiments, e.g., the embodiment shown in FIGS. 39-45, without undue experimentation. As shown, FIG. 35A illustrates that a proximity sensor 110 is positioned underneath the lower end 48*a* of the elongated portion 48 to detect the movement/position of the elongated portion 48 (and thus the movement/position of the knife 18). FIG. 35B illustrates that a magnet 112 is attached to the lower end 48*a* of the elongated portion 48 and a hall sensor/reed switch 110 is positioned underneath the lower end 48*a* of the elongated portion 48 to detect the movement/position of the elongated portion 48 (and thus the movement/position of the knife 18). FIG. 35C illustrates that a limit switch 110 is positioned underneath the lower end 48*a* of the elongated portion 48 to detect the movement/position of the elongated portion 48 (and thus the movement/position of the knife 18). FIG. 35D illustrates that a magnet 114 is attached to a portion of the safety pin 96/97, and a hall sensor/reed switch 110 is positioned close to the portion of the safety pin 96/97 to detect the movement/position of the safety pin 96/97. FIG. 35E illustrates that a metal flag 116 is attached to a portion of the safety pin 96/97, and a limit switch 110 is positioned close to the portion of the safety pin 96/97 to detect the movement/position of the safety pin 96/97.

The term “interlock” is intended to communicate that a mechanical safety feature such as a pin 96/97 or another safety feature within and/or extending into the housing is configured to engage with one or more elements of the knife/shaft assembly, and/or thereby effectively detect its position. That position may be communicated by visible and/or tactile means such as the safety pin positions described to FIGS. 31-45, which may further be detected by a sensor associated with a safety pin and/or another in-the-housing element of the knife/shaft assembly, where the sensor provides mechanical and/or electrical communication with the motor such that the motor will not operate unless the knife/shaft assembly is in a safe operating position.

Referring to FIGS. 36-38, by adding the third groove 57, the slicer 10 provides two cleaning positions, as needed. When the detent 58 is received in the second groove 52, the knife 18 is in the cleaning position 30 (e.g., as shown in FIG.

37), and when the detent 58 is received in the third groove 57, the knife 18 is in the extended cleaning position 31 (e.g., as shown in FIG. 38). A user may selectively move the knife 18 to the cleaning position 30 or the extended cleaning position 31, as desired and/or needed, to meet different cleaning requirements.

The configuration (e.g., length) of the upper shaft 44, the first, second, and third grooves 50, 52, and 57, and the safety pin 96, and the number and position of the grooves on the upper shaft 44 may be varied, without departing from the scope of this application, as long as the intended functions discussed above can be achieved.

Another embodiment of the telescoping slicer 10 is described with reference to FIGS. 39-45. For the sake of brevity, the similar or same structures and functions of the slicer that have been discussed above will not be repeated again, including but not limited to the configuration of the lower assembly 14, the upper assembly 16, the knife 18, the knife cover 22, and the telescoping tool assembly 15, and how to use the telescoping tool assembly 15 to move the knife 18 between the operating position and the cleaning position. A person of ordinary skill in the art will understand, by reading the specification above, how the main components of the slicer 10 in FIGS. 39-45 are configured and used.

As shown in FIGS. 39-45, the upper shaft 44 of the upper assembly 16 of the slicer 10 includes a first groove 50 and a second groove 52 disposed closer to the first end portion 60 of the upper shaft 44. The lower shaft 34 in this embodiment may not include a lower shaft groove or detent 58. Instead, the slicer 10 may include an external (safety) pin 97 extending through a portion of the housing 98 of the slicer 10 and into the internal space of the housing. The external pin 97 extends between a first end 97*a* and a second end 97*b*. Similar to the function of the detent 58 discussed above, the first end 97*a* of the external pin 97 may extend into the first groove 50 or the second groove 52 to secure the knife 18 in the operating position 28 or the cleaning position 30.

Figure 43:
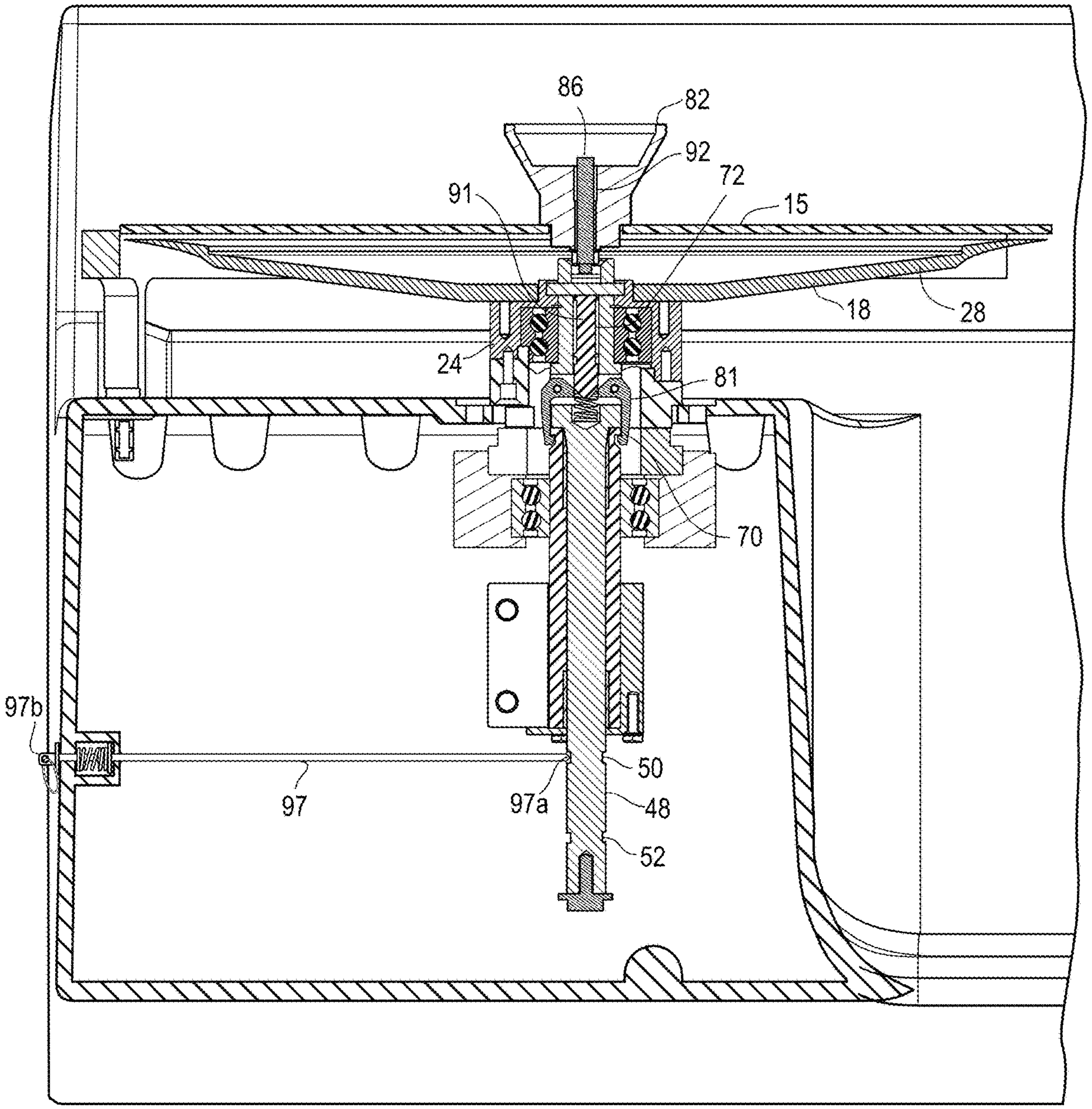
FIG. 43 is a cross-sectional view of a portion of the product slicer of FIG. 39, showing the knife in the operating position.
Figure 44:
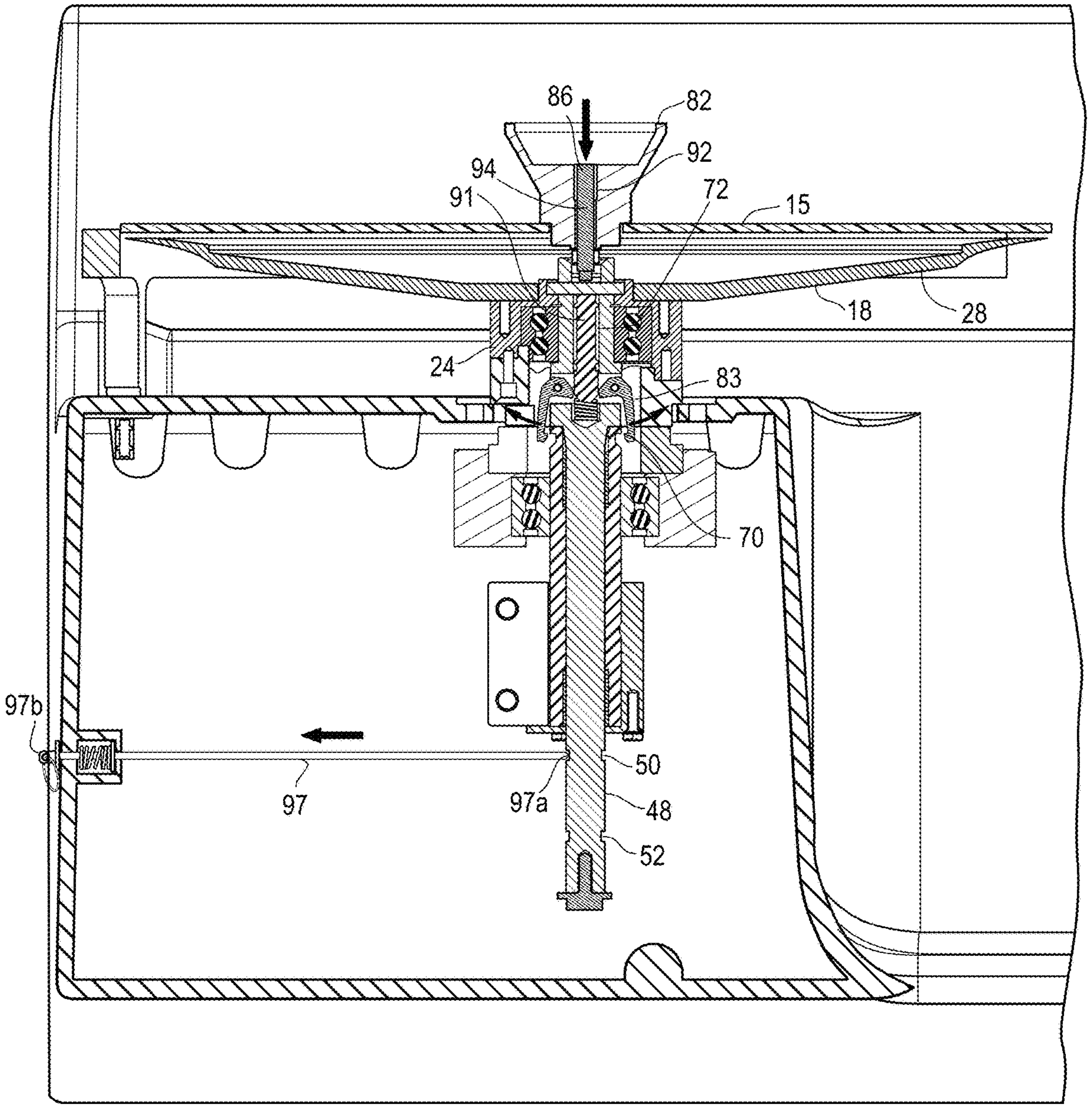
FIG. 44 is another cross-sectional view of the portion of the product slicer of FIG. 43, showing the tool release pin is pressed.
Figure 45:
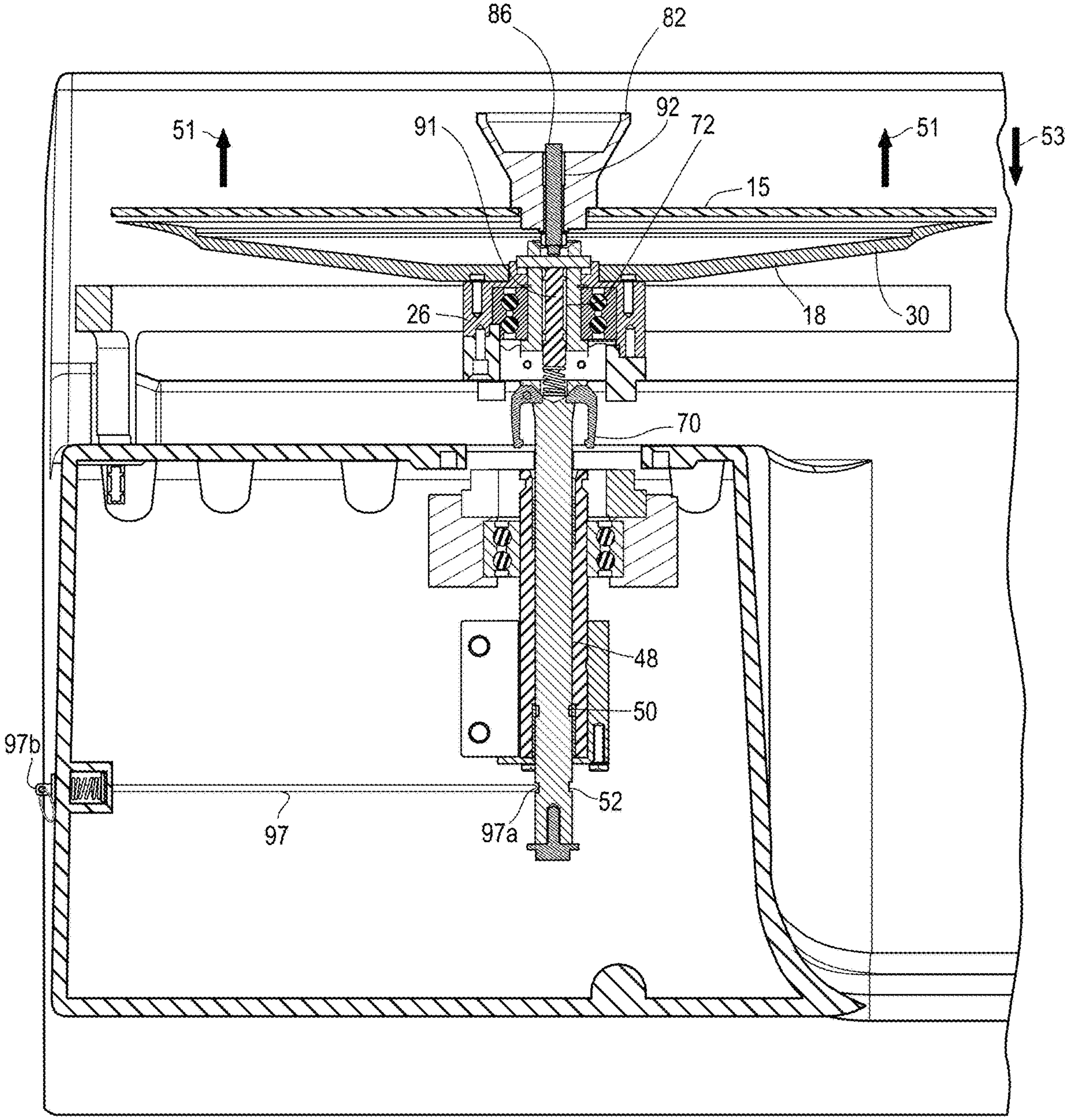
FIG. 45 is a cross-sectional view of a portion of the product slicer of FIG. 40, showing the knife in the cleaning position.

As discussed above with respect to the detent 58, when the first end 97*a* of the external pin 97 extends into the first groove 50, the knife 18 is in the operating position 28 (e.g., as shown in FIG. 43). When the knife 18 is moved from the operating position 28 towards the cleaning position 30, the first end 97*a* of the external pin 97 may be urged out of the first groove 50, and when the knife 18 reaches the cleaning position 30, the first end 97*a* of the external pin 97 may be urged towards and into the second groove 52 (e.g., via a spring loaded mechanism disposed at the second end 97*b* of the external pin 97), such that the knife 18 is secured at the cleaning position 30.

The configuration (e.g., length) of the upper shaft 44, the first and second grooves 50, 52, and the external pin 97, and the number and position of the grooves on the upper shaft 44 may be varied, without departing from the scope of this application, as long as the intended functions discussed above can be achieved. Also, the external pin 97 may also provides a safety feature, which is similar to the mechanisms discussed above with respect to the safety pin 96, such that when the first end 97*a* of the external pin 97 is not in the first groove 50, the slicer 10 cannot be started to perform the slicing operation (e.g., by disabling the start button). This configuration is advantageous for reducing the chance of accidental user injury during the cleaning process.

The subject matter of the disclosure may also relate, among others, to the following aspects:

A first aspect relates to a slicer, comprising: a base; a lower assembly supported by the base; an upper assembly moveably coupled to the lower assembly; and a knife coupled to the upper assembly, where the knife is rotatable around a rotation axis, wherein the upper assembly is movable along the rotation axis, relative to the lower assembly, between an initial position and a static extended position.

A second aspect relates to the slicer of aspect 1, wherein when the upper assembly is in the initial position, the knife is in an operating position, and wherein when the upper assembly is in the extended position, the knife is in a cleaning position.

A third aspect relates to the slicer of any preceding aspect, wherein the knife moves further away from the lower assembly when the knife moves from the operating position to the cleaning position.

A fourth aspect relates to the slicer of any preceding aspect, wherein the upper assembly includes an upper shaft, the upper shaft having a top portion and an elongated portion, wherein the elongated portion includes a first groove or detent and a second groove or detent, wherein the first groove or detent is configured to secure the upper assembly to the initial position, and wherein the second groove or detent is configured to secure the upper assembly to the extended position.

A fifth aspect relates to the slicer of any preceding aspect, wherein the lower assembly includes a lower shaft, the lower shaft including a lumen extending through the lower shaft, wherein the elongated portion of the upper shaft extends through at least a portion of the lumen of the lower shaft, and wherein a lower shaft groove or detent is configured to secure the elongated portion of the upper shaft to the lower shaft via the first groove or detent or the second groove or detent of the elongated portion of the upper shaft.

A sixth aspect relates to the slicer of any preceding aspect, further comprising a safety pin extending between a first end and a second end, wherein the elongated portion further includes a third groove, and wherein the safety pin is moveable between a locked position, where the first end of the safety pin extends into the third groove, and an unlocked position, where the first end of the safety pin is pulled out of the third groove.

A seventh aspect relates to the slicer of any preceding aspect, wherein when the safety pin is in the locked position, the knife is prevented from being moved from an operating position to a cleaning position.

An eighth aspect relates to the slicer of any preceding aspect, further comprising a sensor, wherein the sensor is configured to prevent the slicer from being started to perform a slicing operation when the safety pin is not in the locked position or when the knife is not in an operating position.

A ninth aspect relates to the slicer of any preceding aspect, further comprising a safety pin extending through a housing of the slicer and extending between a first end and a second end, wherein when the first end of the safety pin extends into the first groove of the elongated portion, the knife is secured to an operating position, and wherein when the first end of the safety pin extends into the second groove of the elongated portion, the knife is secured to a cleaning position.

A tenth aspect relates to the slicer of any preceding aspect, wherein the lower assembly includes a lower engagement portion and the upper assembly includes an upper engagement portion, and wherein the lower and upper engagement portions are configured to engage each other such that when the upper assembly is in the initial position, the lower assembly, the upper assembly, and the knife rotate together.

An eleventh aspect relates to a slicer, comprising: a base; a lower assembly supported by the base; an upper assembly moveably coupled to the lower assembly; and a rotatable knife coupled to the upper assembly, wherein the upper assembly is movable relative to the lower assembly along a longitudinal axis of the upper assembly.

A twelfth aspect relates to the slicer of aspect 11, wherein the upper assembly includes a latch and a shaft release pin, wherein the latch is configured to releasably couple the upper assembly to the lower assembly, and the shaft release pin is configured to be movable to release the latch from engagement with the lower assembly.

A thirteenth aspect relates to the slicer of any one of aspects 11 or 12, wherein the shaft release pin is movable along the longitudinal axis of the upper assembly, and wherein when the shaft release pin moves towards the lower assembly, the latch is released from engagement with the lower assembly.

A fourteenth aspect relates to the slicer of any one of aspects 11 to 13, wherein the upper assembly includes an upper shaft, the upper shaft having a top portion and an elongated portion, wherein the lower assembly includes a lower shaft, the lower shaft extending between a first end portion and a second end portion, and wherein the top portion of the upper shaft includes a latch configured to releasably couple the upper assembly to the first end portion of the lower shaft.

A fifteenth aspect relates to the slicer of any one of aspects 11 to 14, wherein the lower assembly includes a lower engagement portion and the upper assembly includes an upper engagement portion, and wherein the lower and upper engagement portions are configured to engage each other such that the lower assembly, the upper assembly, and the knife rotate together around the longitudinal axis of the upper assembly.

A sixteenth aspect relates to a slicer, comprising: a base; a lower assembly supported by the base; an upper assembly moveably coupled to the lower assembly; a rotatable knife coupled to the upper assembly; and a telescoping tool assembly releasably coupled to the upper assembly, wherein the telescoping tool assembly is configured to move the knife between an operating position and a cleaning position, where the cleaning position includes the knife remaining attached to the slicer.

A seventeenth aspect relates to the slicer of aspect 16, wherein the telescoping tool assembly includes a tool release pin, wherein the tool release pin is configured to at least partially release the upper assembly from engagement with the lower assembly such that the knife can be moved from the operating position to the cleaning position.

An eighteenth aspect relates to the slicer of any one of aspects 16 or 17, wherein the upper assembly includes a latch and a shaft release pin, and the telescoping tool assembly includes a tool release pin, wherein the latch is configured to releasably couple the upper assembly to the lower assembly, and wherein the tool release pin is configured to move the shaft release pin to release the latch from engagement with the lower assembly.

A nineteenth aspect relates to the slicer of any one of aspects 16 to 18, wherein the telescoping tool assembly is configured to move the knife and the upper assembly together relative to the lower assembly.

A twentieth aspect relates to the slicer of any one of aspects 16 to 19, wherein when the knife is in the operating position, the upper assembly is secured to the lower assembly at an initial position, and when the knife is in the cleaning position, the upper assembly is secured to the lower assembly at an extended position.

A twenty-first aspect relates to a method of moving a knife of a slicer between an operating position and a cleaning position, wherein the slicer comprises a base, a lower assembly supported by the base, an upper assembly moveably coupled to the lower assembly, and a knife coupled to the upper assembly, the method comprising: coupling a telescoping tool assembly to the upper assembly; moving the knife from the operating position to the cleaning position, by pulling the knife away from the lower assembly via the telescoping tool assembly; moving the knife from the cleaning position to the operating position by pushing the knife back towards the lower assembly via the telescoping tool assembly; and removing the telescoping tool assembly from the upper assembly.

A twenty-second aspect relates to the method of aspect 21, wherein the telescoping tool assembly includes a tool release pin, the method further comprising: pushing the tool release pin to a pressed position; and holding the tool release pin at the pressed position while moving the knife between the operating position and the cleaning position.

A twenty-third aspect relates to the method of any one of aspects 21 or 22, further comprising removing a knife cover before coupling the telescoping tool assembly to the upper assembly.

A twenty-fourth aspect relates to the method of any one of aspects 21 to 23, further comprising disabling a slicing function of the slicer in response to detecting a knife cover is removed from the slicer, a safety pin is not engaged fully with the upper assembly, or both.

A twenty-fifth aspect relates to the method of any one of aspects 21 to 24, further comprising moving a safety pin of the slicer from a locked position to an unlocked position before moving the knife from the operating position to the cleaning position.

A twenty-sixth aspect relates to the method of any one of aspects 21 to 25, further comprising moving the safety pin of the slicer from the unlocked position to the locked position after moving the knife from the cleaning position to the operating position.

In addition to the features mentioned in each of the independent aspects enumerated above, some examples may show, alone or in combination, the optional features mentioned in the dependent aspects and/or as disclosed in the description above and shown in the figures.

Those of skill in the art will appreciate that embodiments not expressly illustrated herein may be practiced within the scope of the claims, including that features described herein for different embodiments may be combined with each other and/or with currently-known or future-developed technologies while remaining within the scope of the claims. By this, it is specifically intended and understood that, in view of the foregoing disclosure, those of skill in the art will readily be able to use, combine, and interchange structures and functions of the embodiments of FIGS. 1-30, 31-38, and/or 39-45 without undue experimentation and within the scope of the present disclosure, including at least providing safety pin and/or other safety interlock features in the embodiment of FIGS. 1-30. Although specific terms are employed herein, they are used in a generic and descriptive sense only and not for purposes of limitation unless specifically defined by context, usage, or other explicit designation. It is therefore intended that the foregoing detailed description be regarded as illustrative rather than limiting. And, it should be understood that the following claims, including all equivalents, are intended to define the spirit and scope of this invention. Furthermore, the advantages described above are not necessarily the only advantages of the invention, and it is not necessarily expected that all of the described advantages will be achieved with every embodiment. In the event of any inconsistent disclosure or definition from the present application conflicting with any document incorporated by reference, the disclosure or definition herein shall be deemed to prevail.

I claim:

1. A slicer, comprising:

a base;

a lower assembly supported by the base;

an upper assembly moveably coupled to the lower assembly; and a knife coupled to the upper assembly, where the knife is rotatable around a rotation axis, wherein the upper assembly is movable along the rotation axis, relative to the lower assembly, between an initial position and a static extended position, wherein the lower assembly includes a lower engagement portion and the upper assembly includes an upper engagement portion, wherein the lower and upper engagement portions are configured to engage each other such that in the initial position the lower engagement portion, the upper engagement portion, and the knife are rotatable around the rotation axis, wherein the upper assembly includes an upper shaft, the upper shaft having a top portion and an elongated portion, wherein the elongated portion includes a first groove or detent and a second groove or detent, wherein the first groove or detent is configured to secure the upper assembly to the initial position, wherein the second groove or detent is configured to secure the upper assembly to the extended position, and wherein the slicer further comprising a safety pin extending between a first end and a second end, wherein the elongated portion further includes a third groove, and wherein the safety pin is moveable between a locked position, where the first end of the safety pin extends into the third groove, and an unlocked position, where the first end of the safety pin is pulled out of the third groove.

2. The slicer of claim 1, wherein when the upper assembly is in the initial position, the knife is in an operating position, and wherein when the upper assembly is in the extended position, the knife is in a cleaning position.

3. The slicer of claim 2, wherein the knife moves further away from the lower assembly when the knife moves from the operating position to the cleaning position.

4. The slicer of claim 1, wherein the lower assembly includes a lower shaft, the lower shaft including a lumen extending through the lower shaft, wherein the elongated portion of the upper shaft extends through at least a portion of the lumen of the lower shaft, and wherein a lower shaft groove or detent is configured to secure the elongated portion of the upper shaft to the lower shaft via the first groove or detent or the second groove or detent of the elongated portion of the upper shaft.

5. The slicer of claim 1, wherein when the safety pin is in the locked position, the knife is prevented from being moved from an operating position to a cleaning position.

6. The slicer of claim 1, further comprising a sensor, wherein the sensor is configured to prevent the slicer from being started to perform a slicing operation when the safety pin is not in the locked position or when the knife is not in an operating position.

7. The slicer of claim 1, further comprising a safety pin extending through a housing of the slicer and extending between a first end and a second end, wherein when the first end of the safety pin extends into the first groove of the elongated portion, the knife is secured to an operating position, and wherein when the first end of the safety pin extends into the second groove of the elongated portion, the knife is secured to a cleaning position.

8. The slicer of claim 1, wherein when the upper assembly is in the initial position, the lower assembly, the upper assembly, and the knife are configured to rotate together.

9. The slicer of claim 1, wherein the slicer includes safety feature means to disable a slicing function of the knife when the upper assembly is in the extended position.

10. The slicer of claim 9, comprising a motor for rotating the knife, where the safety feature means comprises one of:

a sensor configured to detect a knife cover position, disposed in communication with a control board of the slicer;

a safety pin that prevents the knife from being moved from an operating position when the safety pin is in a locked position;

a safety pin in communication with a start button such that the start button is disabled when the safety pin is not in a locked position;

a sensor configured to detect position and/or movement of a safety pin and/or of the knife to form an interlock in communication with the motor such that the motor will not operate the knife unless the knife is in an operating position, and/or unless the safety pin is in a locked position; or a sensor in communication with the safety pin and with the motor, such that the motor will not be operable due to not receiving power, and/or another essential control condition unless the knife is in the operating position, with the safety pin in the locked position.

11. A slicer, comprising:

a base;

a lower assembly supported by the base;

an upper assembly moveably coupled to the lower assembly; and a rotatable knife coupled to the upper assembly, wherein the upper assembly is movable relative to the lower assembly along a longitudinal axis of the upper assembly, wherein the upper assembly includes a latch and a shaft release pin, wherein the latch is configured to releasably couple the upper assembly to the lower assembly, and wherein the shaft release pin is configured to be movable to engage the latch and release the latch from engagement with the lower assembly.

12. The slicer of claim 11, wherein the shaft release pin is movable along the longitudinal axis of the upper assembly, and wherein when the shaft release pin moves towards the lower assembly, the latch is released from engagement with the lower assembly.

13. The slicer of claim 11, wherein the upper assembly includes an upper shaft, the upper shaft having a top portion and an elongated portion, wherein the lower assembly includes a lower shaft, the lower shaft extending between a first end portion and a second end portion, and wherein the top portion of the upper shaft includes the latch configured to releasably couple the upper assembly to the first end portion of the lower shaft.

14. The slicer of claim 11, wherein the lower assembly includes a lower engagement portion and the upper assembly includes an upper engagement portion, and wherein the lower and upper engagement portions are configured to engage each other such that the lower assembly, the upper assembly, and the knife rotate together around the longitudinal axis of the upper assembly.

15. A method of moving the knife of the slicer of claim 11 between an operating position and a cleaning position, comprising:

coupling a telescoping tool assembly to the upper assembly;

moving the knife from the operating position to the cleaning position, by pulling the knife away from the lower assembly via the telescoping tool assembly;

moving the knife from the cleaning position to the operating position by pushing the knife back towards the lower assembly via the telescoping tool assembly; and removing the telescoping tool assembly from the upper assembly.

16. The method of claim 15, wherein the telescoping tool assembly includes a tool release pin, the method further comprising:

pushing the tool release pin to a pressed position; and holding the tool release pin at the pressed position while moving the knife between the operating position and the cleaning position.

17. The method of claim 15, further comprising removing a knife cover before coupling the telescoping tool assembly to the upper assembly.

18. The method of claim 15, further comprising disabling a slicing function of the slicer in response to detecting a knife cover is removed from the slicer, a safety pin is not engaged fully with the upper assembly, or both.

19. The method of claim 15, further comprising moving a safety pin of the slicer from a locked position to an unlocked position before moving the knife from the operating position to the cleaning position.

20. The method of claim 19, further comprising moving the safety pin of the slicer from the unlocked position to the locked position after moving the knife from the cleaning position to the operating position.

21. A slicer, comprising:

a base;

a lower assembly supported by the base;

an upper assembly moveably coupled to the lower assembly;

a rotatable knife coupled to the upper assembly; and a telescoping tool assembly releasably coupled to the upper assembly, wherein the telescoping tool assembly is configured to move the knife between an operating position and a cleaning position, where the cleaning position includes the knife remaining attached to the slicer, wherein the upper assembly includes a latch and a shaft release pin, and the telescoping tool assembly includes a tool release pin, wherein the latch is configured to releasably couple the upper assembly to the lower assembly, and wherein the tool release pin is configured to engage the shaft release pin and move the shaft release pin to engage and release the latch from engagement with the lower assembly.

22. The slicer of claim 21, wherein the tool release pin is configured to at least partially release the upper assembly from engagement with the lower assembly such that the knife can be moved from the operating position to the cleaning position.

23. The slicer of claim 21, wherein the telescoping tool assembly is configured to move the knife and the upper assembly together relative to the lower assembly.

24. The slicer of claim 21, wherein when the knife is in the operating position, the upper assembly is secured to the lower assembly at an initial position, and when the knife is in the cleaning position, the upper assembly is secured to the lower assembly at an extended position.

25. The slicer of claim 21, wherein the tool release pin is configured to be pressed to push the shaft release pin towards the lower assembly, such that the latch is pivoted to at least partially disengage from the lower assembly.

* * * * *